United States Patent [19]

Whitney et al.

[11] 4,413,536
[45] Nov. 8, 1983

[54] AUTOMATIC TRANSAXLE CONTROL SYSTEM

[75] Inventors: Douglas A. Whitney, Livonia; Sergio Kavalhuna, Plymouth, both of Mich.

[73] Assignee: Ford Motor Company, Dearborn, Mich.

[21] Appl. No.: 176,948

[22] Filed: Aug. 11, 1980

[51] Int. Cl.³ .................................... B60K 41/10
[52] U.S. Cl. ............................. 74/869; 74/868
[58] Field of Search ......................... 74/868, 869

[56] References Cited

U.S. PATENT DOCUMENTS

| | | | |
|---|---|---|---|
| 3,309,939 | 3/1967 | Pierce | 74/472 |
| 3,327,554 | 6/1967 | Searles | 74/472 |
| 3,344,681 | 10/1967 | Searles | 74/472 |
| 3,393,585 | 7/1968 | Pierce | 74/864 |
| 3,400,612 | 9/1968 | Pierce | 74/864 |
| 3,590,663 | 7/1971 | Yamaguchi | 74/868 |
| 3,593,599 | 7/1971 | Dach | 74/869 |
| 3,613,484 | 10/1971 | Pierce et al. | 74/869 |
| 3,895,542 | 7/1975 | Miyauchi | 74/868 |
| 3,908,486 | 9/1975 | Mitamura et al. | 74/868 |
| 4,014,223 | 3/1977 | Pierce | 74/688 |
| 4,065,985 | 1/1978 | Taga | 74/869 |
| 4,106,369 | 8/1978 | Taga | 74/869 |
| 4,263,826 | 4/1981 | Hartz et al. | 74/868 |
| 4,313,354 | 2/1982 | Iwanaga et al. | 74/868 |
| 4,314,488 | 2/1982 | Lauven | 74/868 |

Primary Examiner—Lawrence J. Staab
Assistant Examiner—Joseph M. Rolnicki
Attorney, Agent, or Firm—Donald J. Harrington; Keith L. Zerschling

[57] ABSTRACT

An automatic control system for a multiple ratio power transmission mechanism having a hydrokinetic torque converter and multiple ratio gearing, the speed ration of which is controlled by selectively engageable clutches and brakes, the control system including a timing valve circuit that is effective to establish optimum timing between the clutch and brake engagement and release pattern during ratio changes at various driving torques and at various magnitudes of transmission throttle valve pressures, the latter being an indicator of the operator's demand for driving torque.

7 Claims, 36 Drawing Figures

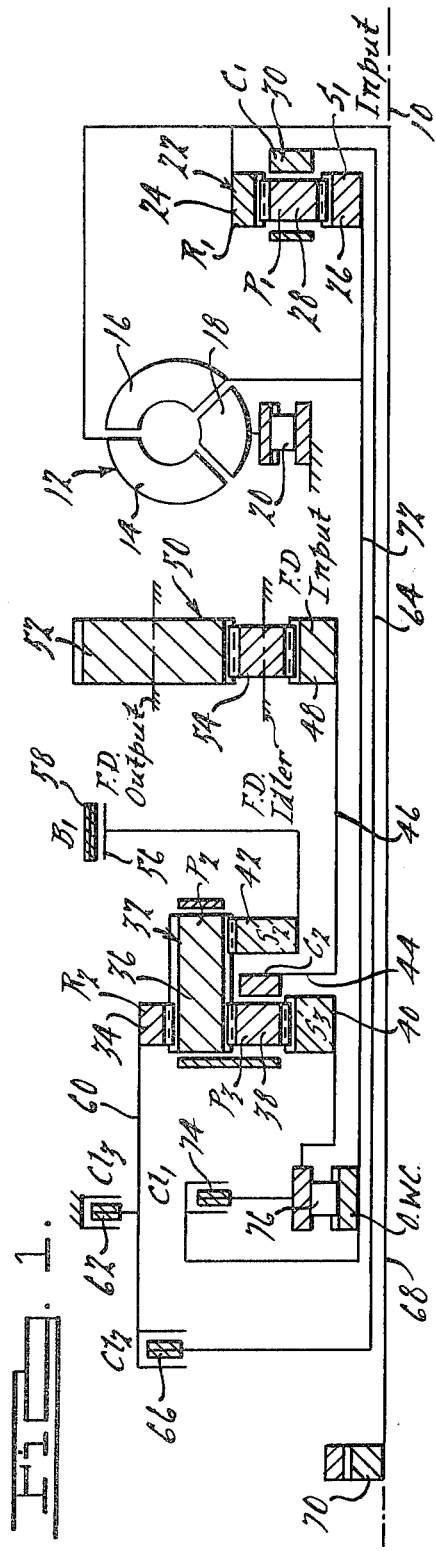

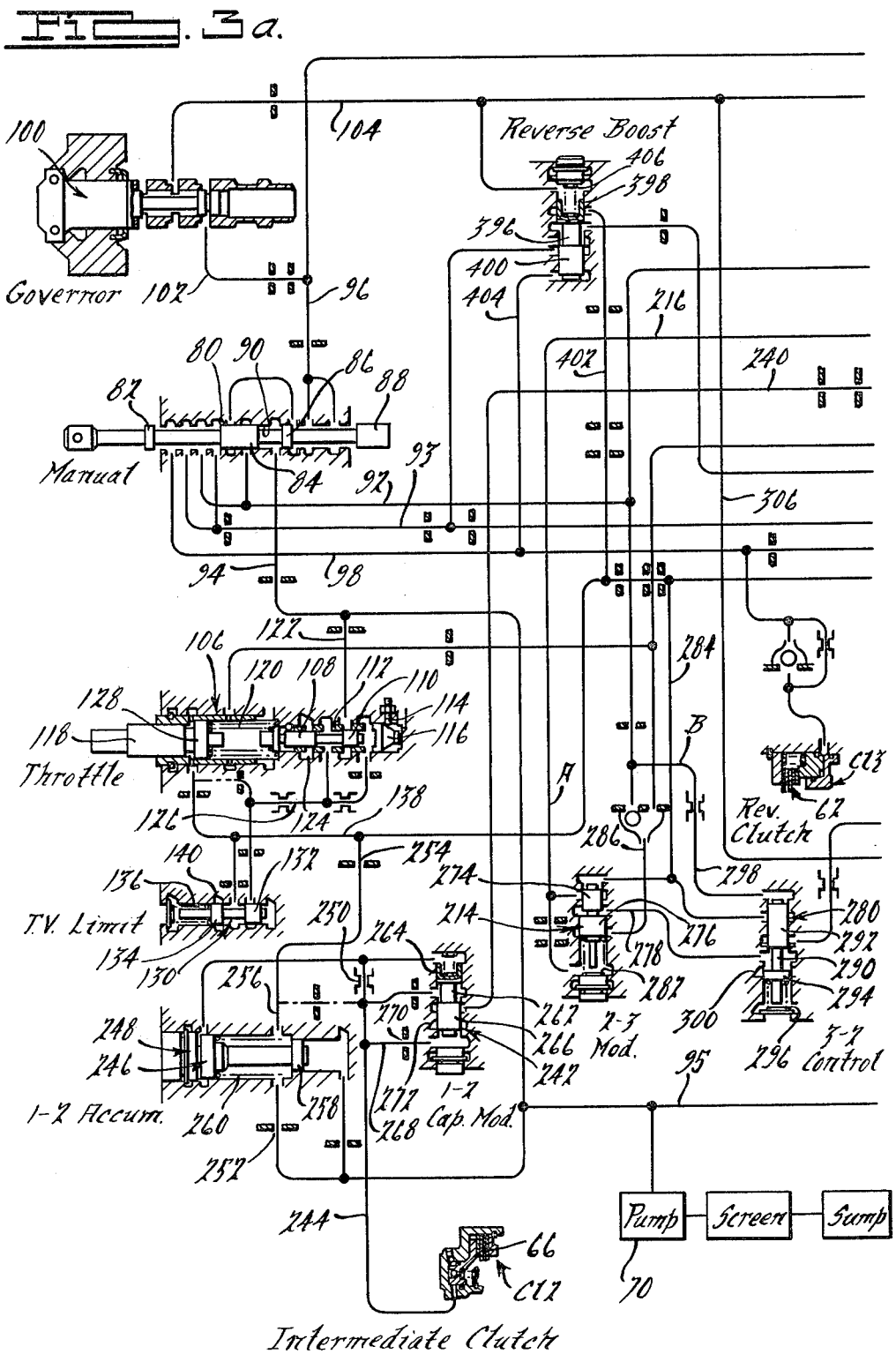

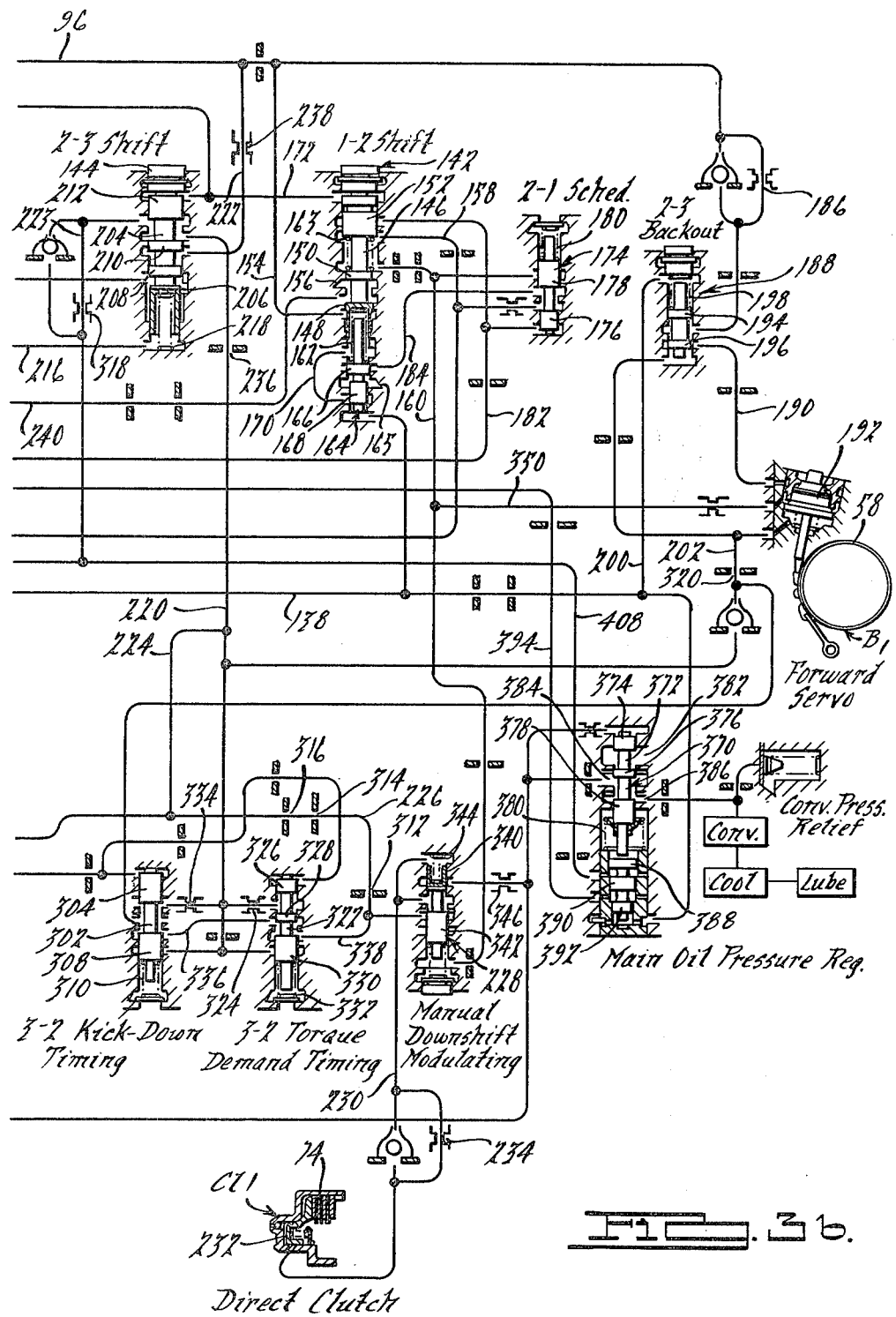

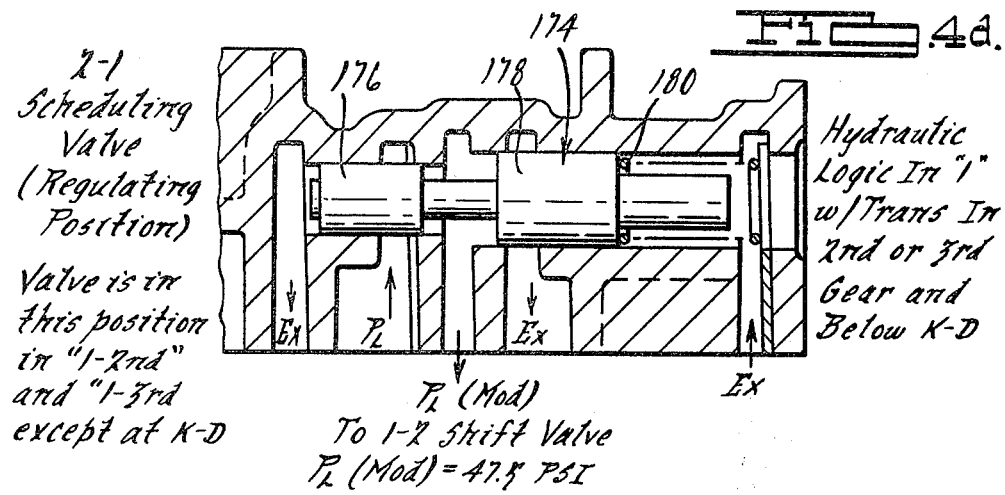
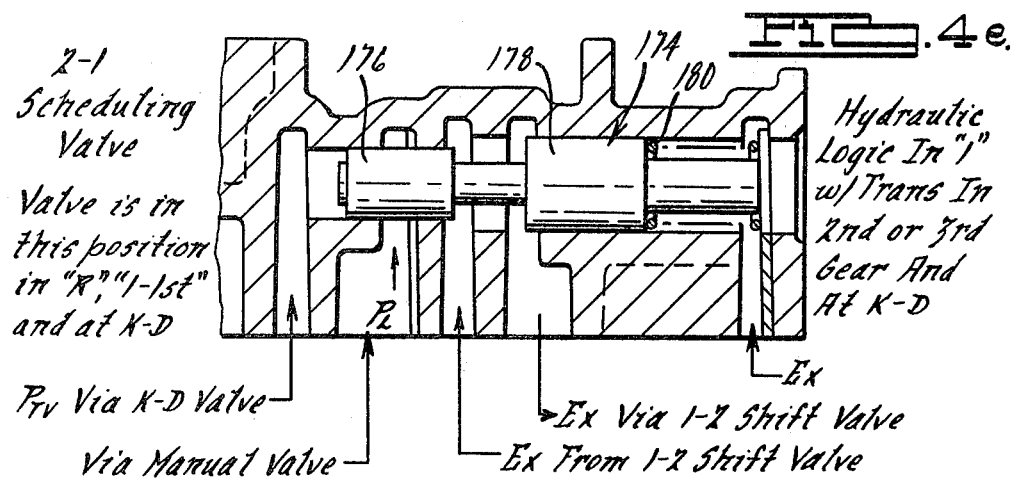
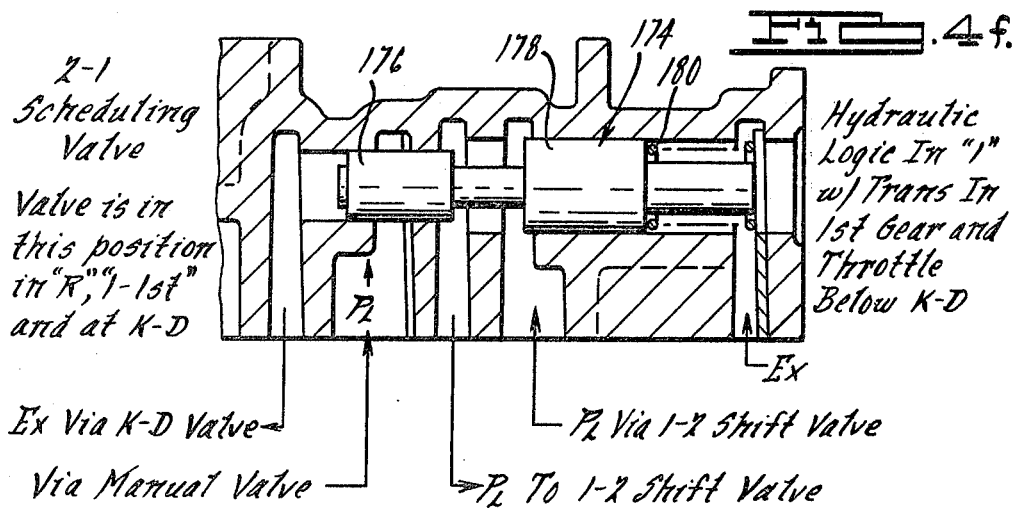

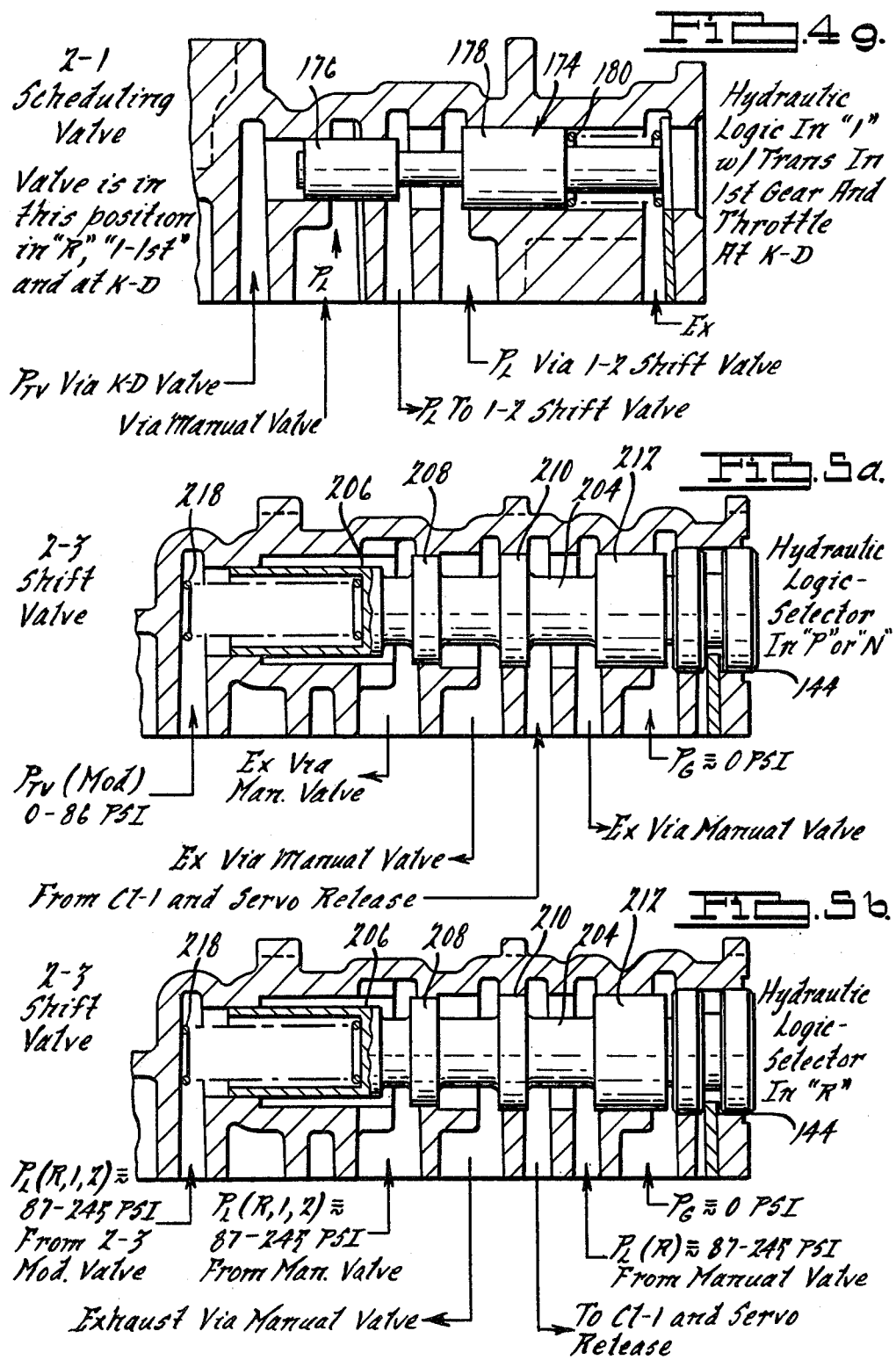

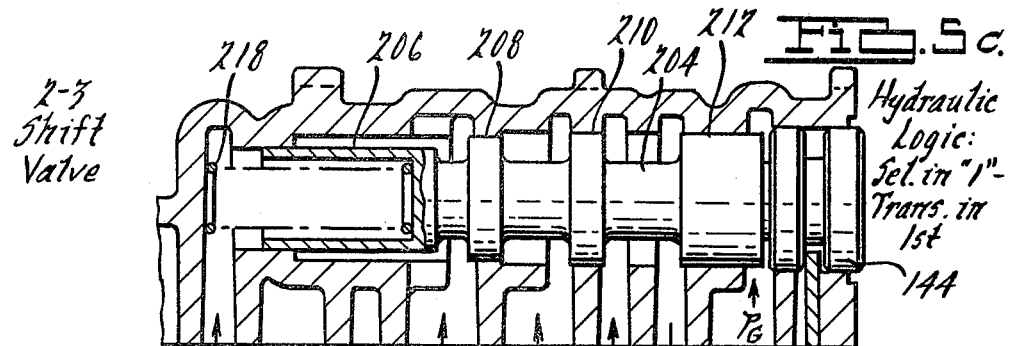
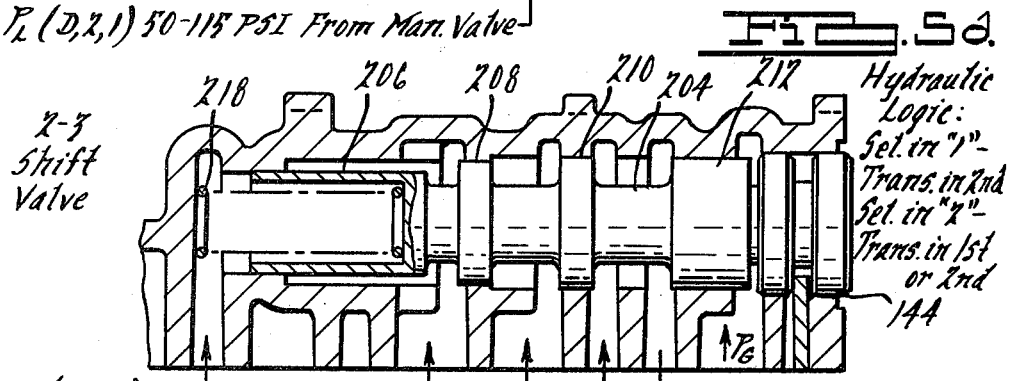
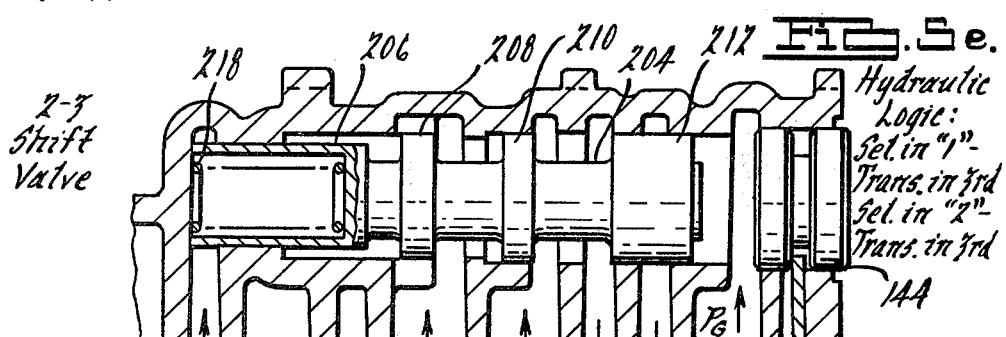

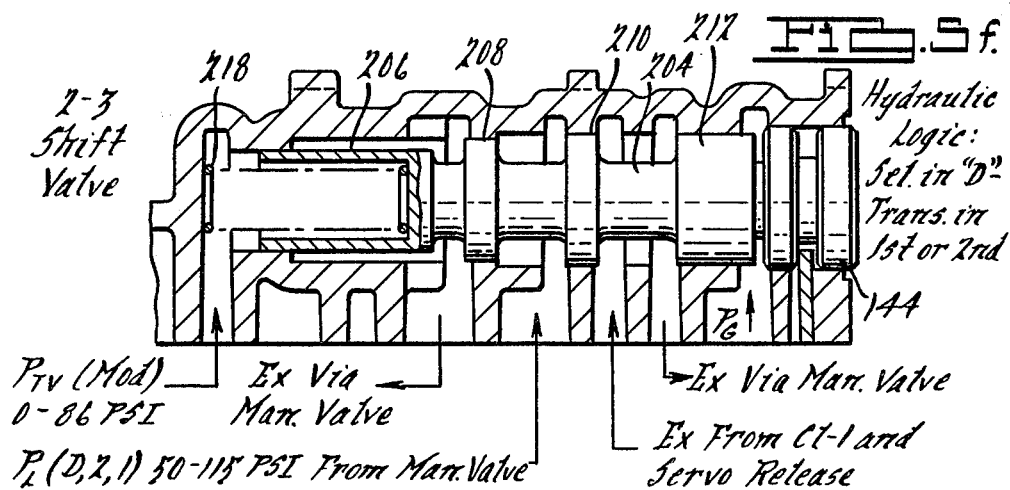
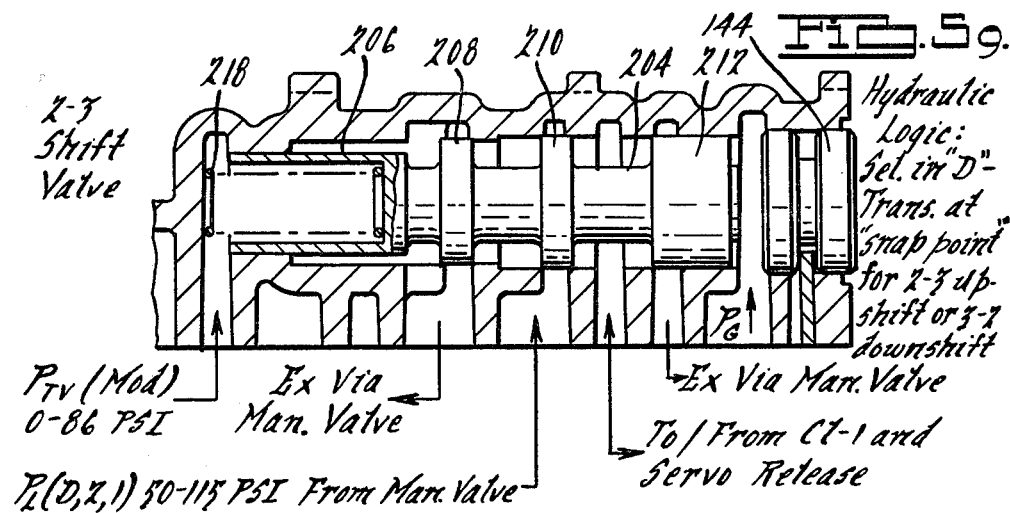
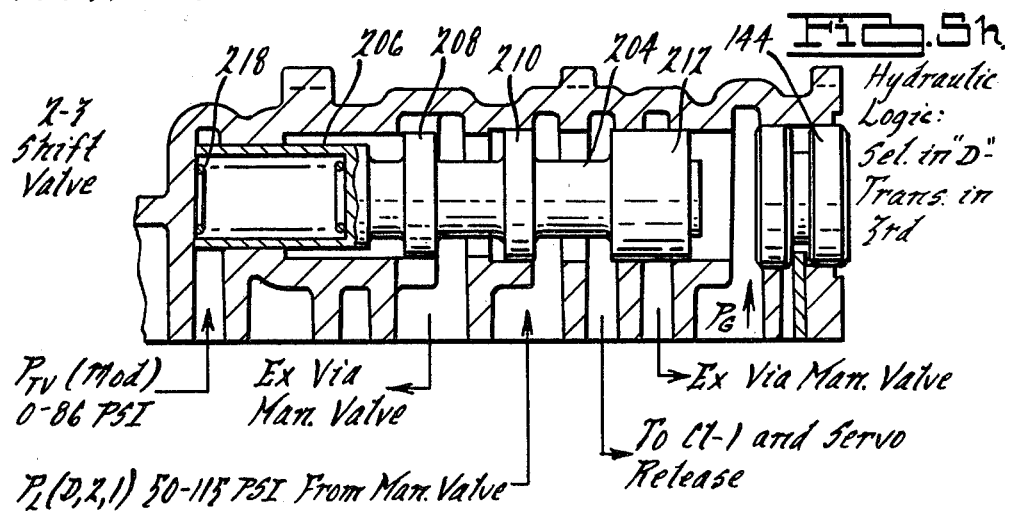

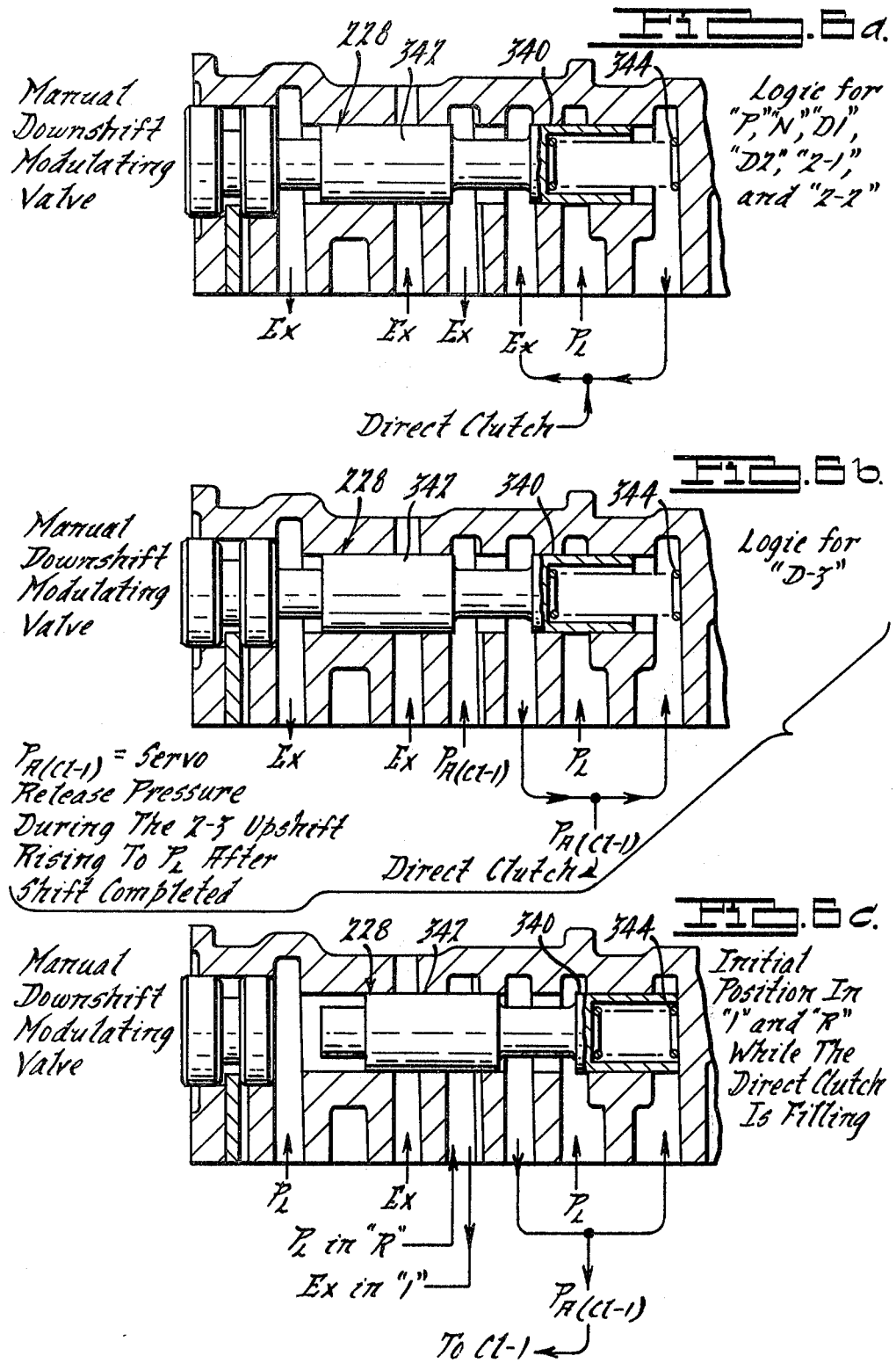

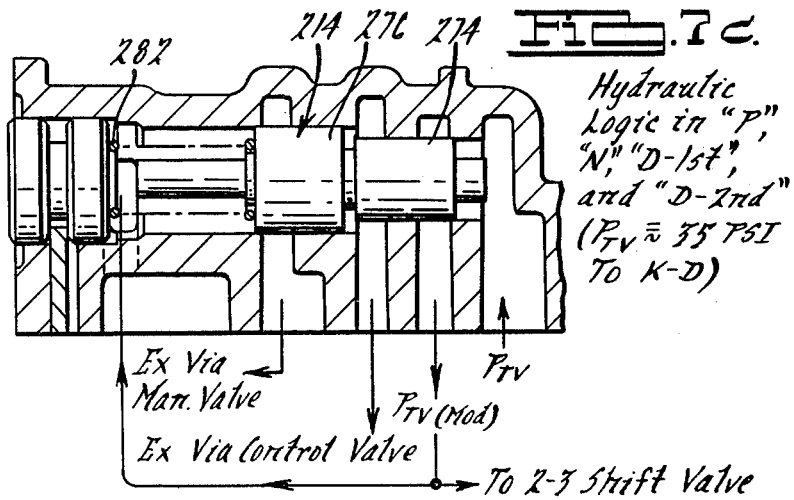
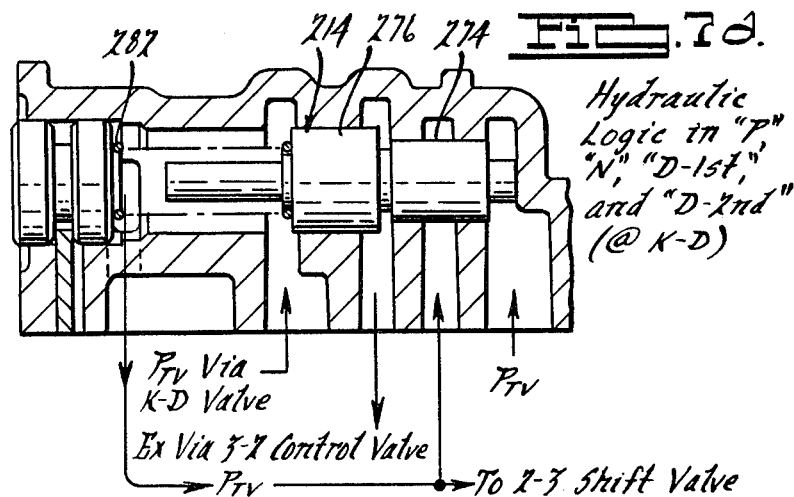
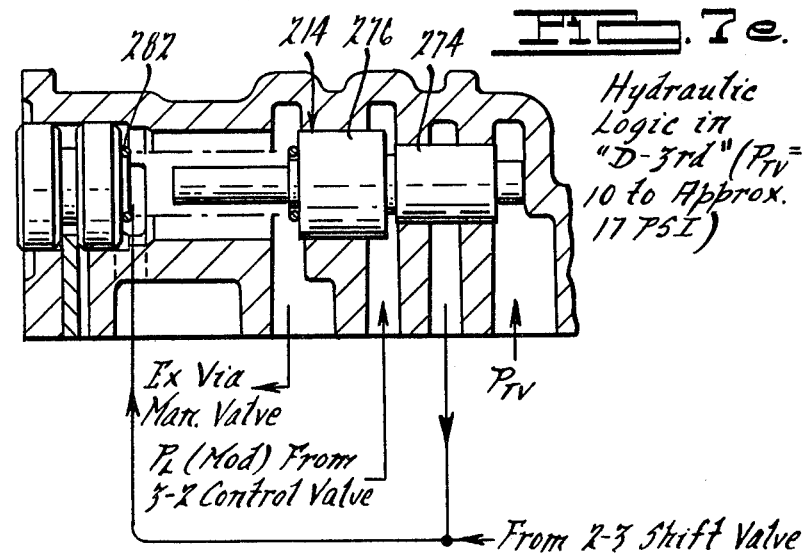

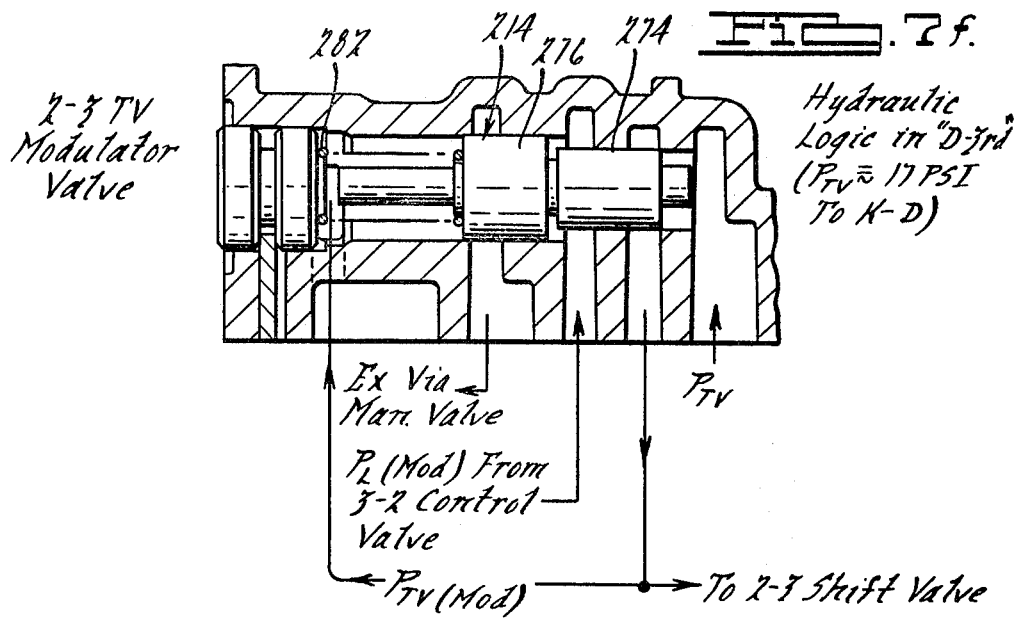
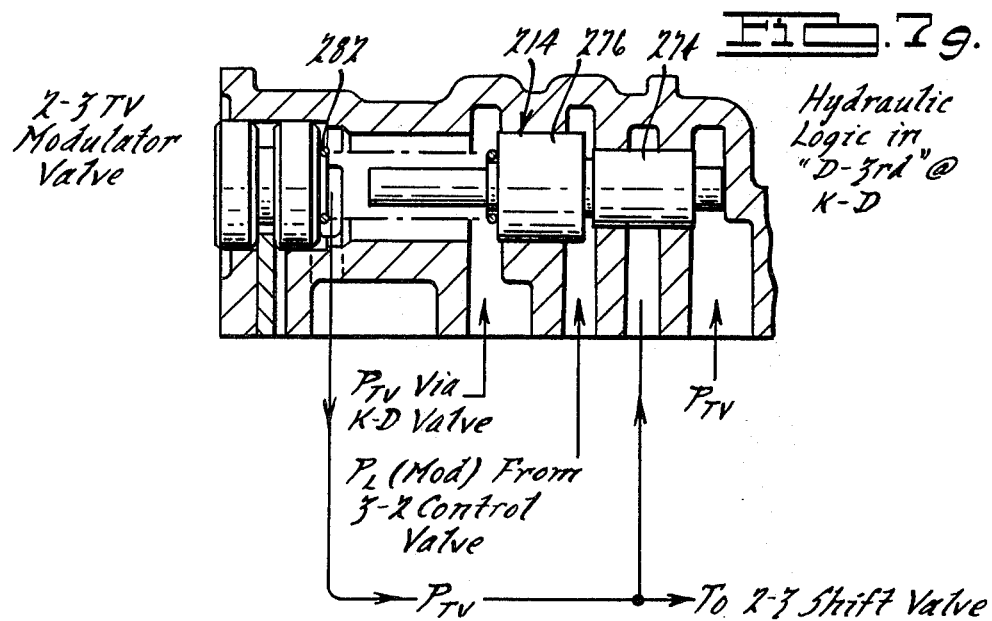

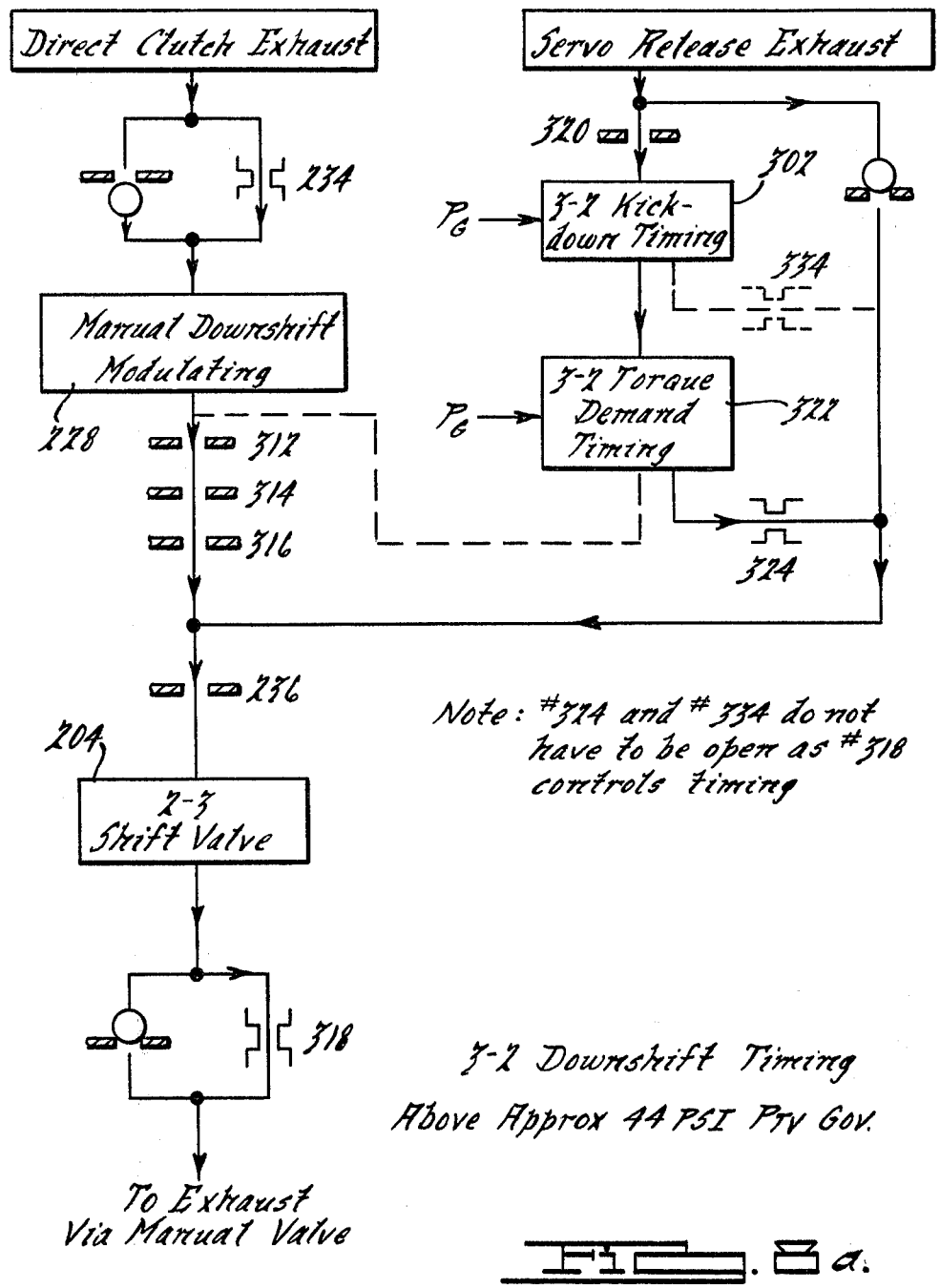

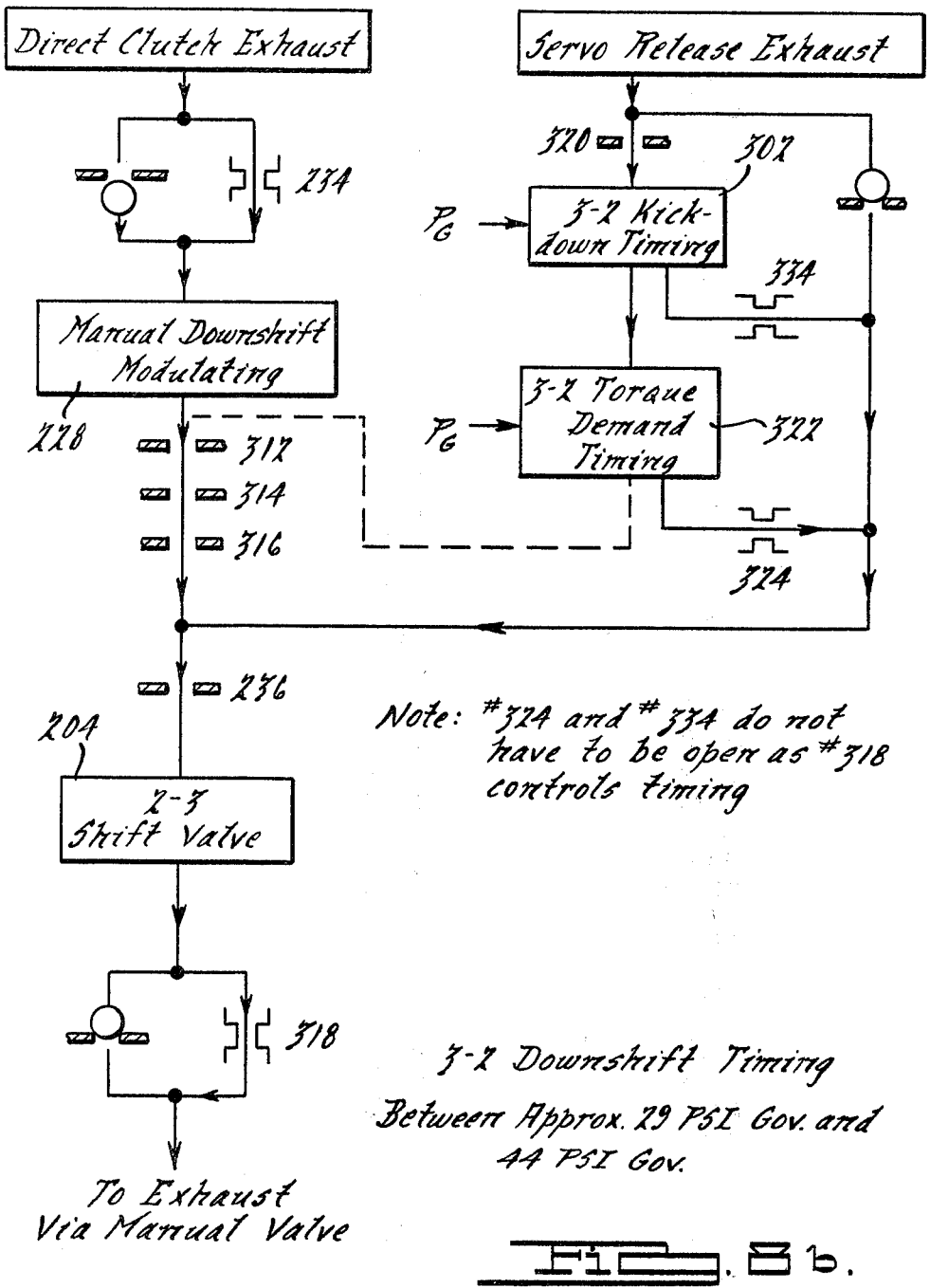

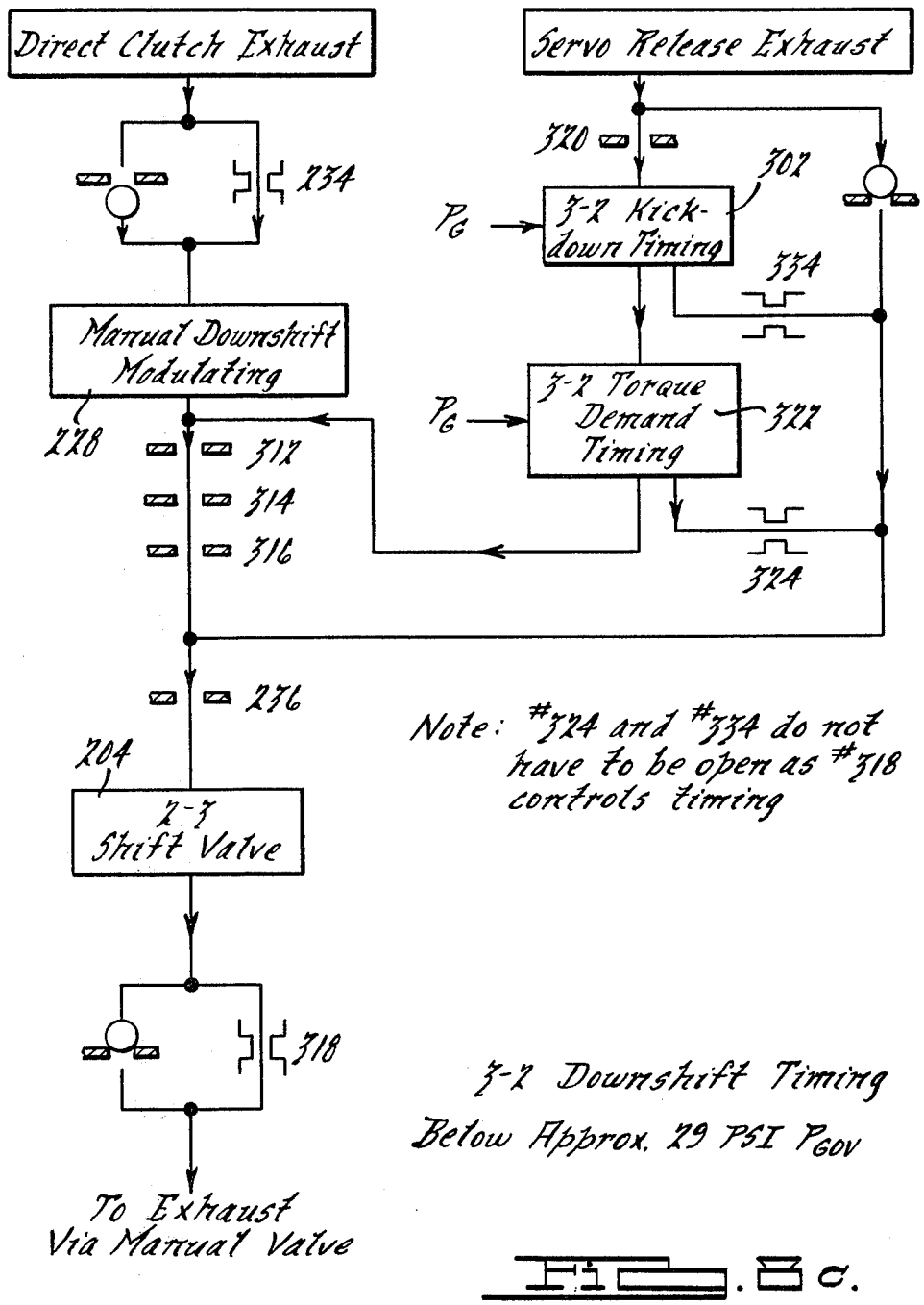

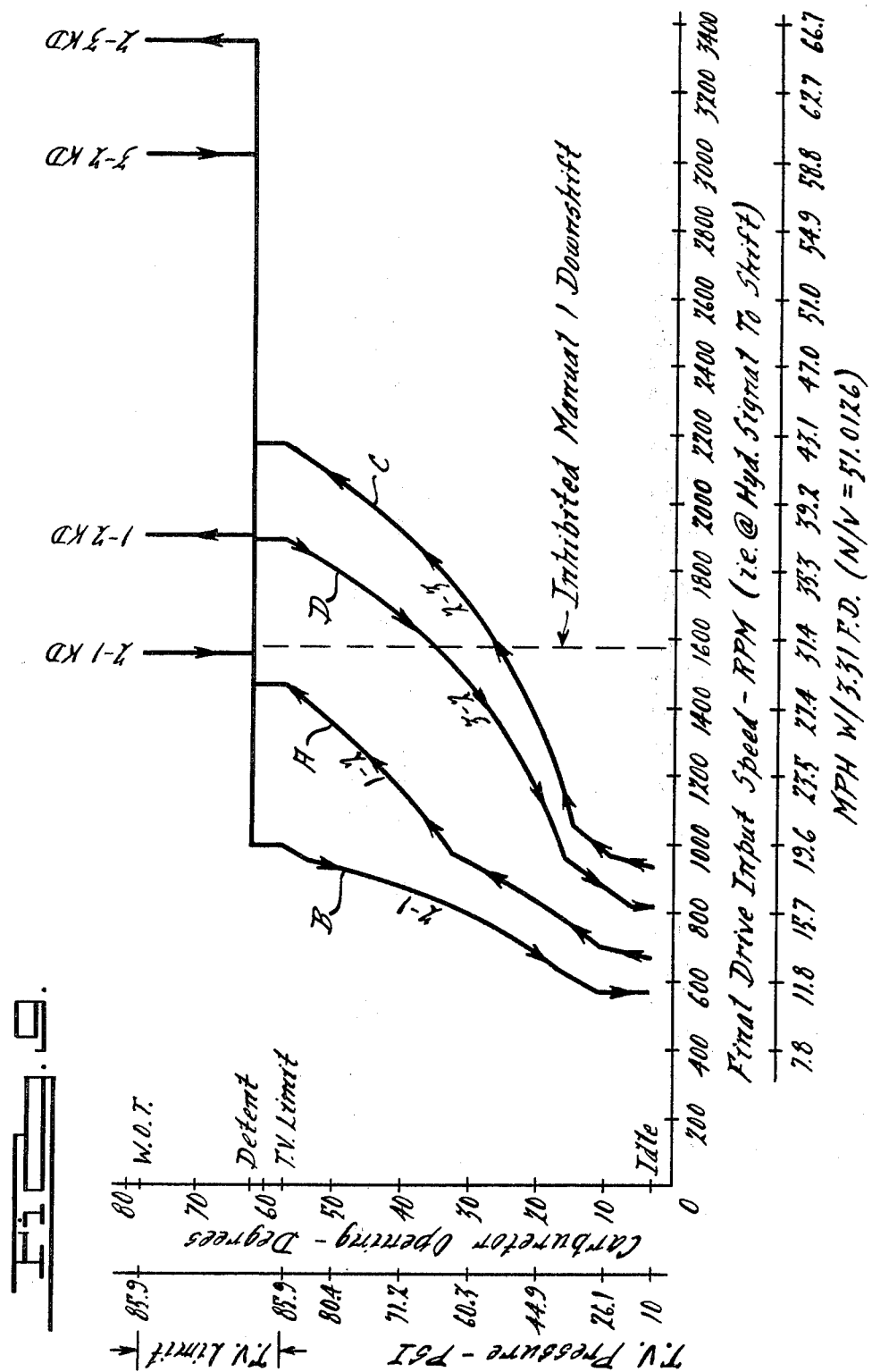

AUTOMATIC TRANSAXLE CONTROL SYSTEM

GENERAL DESCRIPTION OF THE INVENTION

Our invention comprises an improved control valve circuit for use in controlling the gearing for a transaxle of the kind disclosed in U.S. application Ser. No. 134,240, filed Mar. 26, 1980 by George E. Lemieux, Reginald T. Lewicki and Julius A. Clauss, entitled "Transaxle for a Vehicle Driveline", which is assigned to the assignee of this invention. It is adaptable also for controlling gearing of the kind disclosed in U.S. Pat. No. 4,014,223 of Stanley L. Pierce.

We are aware of earlier disclosures with control systems for multiple ratio planetary transmission that have features common to the control system of our invention. These include the disclosure of U.S. application Ser. No. 82,399, filed Oct. 5, 1979 by Alan S. Leonard, R. C. Bolz and Larry D. Burcz. Other prior art disclosures of general interest are found in U.S. Pat. Nos. 3,613,484; 3,309,939; 3,393,585; and 3,400,612, which issued to Stanley L. Pierce. U.S. Pat. Nos. 3,344,681 and 3,327,554 issued to John J. Searles also include features that are found in the present disclosure. Specifically, these prior art references disclose multiple ratio shift valves that respond to a governor pressure signal and a driver controlled throttle valve signal to initiate ratio changes by the application and release of fluid pressure operated servos for the transmission clutches and brakes. These references also disclose a pressure regulator valve system that responds to throttle pressure and wherein provision is made for effecting an increase in the regulated pressure level whenever the torque capacity of the transmission clutches and brakes should be increased, such as during throttle pressure limiting valve similar to the one included in the circuit of our invention and a shift accumulator valve for controlling ratio change between the lowest ratio and the intermediate ratio may be found in disclosure of application Ser. No. 82,399, identified above.

Our present invention is distinguishable from these prior art disclosures by the provision of a shift timing valve circuit for controlling the rate of application and release of the clutches and brakes during ratio changes in accordance with the particular driving conditions and in accordance with the torque transmitting requirements of the transmission at the instant a shift is initiated. The specific valves included in the shift timing valve circuit include a 3–2 torque demand timing valve, a 3–2 kick-down timing valve for controlling forced downshifts under high torque demand and a 2–1 scheduling valve for determining the shift point during a ratio change from the intermediate ratio to the low speed ratio.

BRIEF DESCRIPTION OF THE FIGURES OF THE DRAWINGS

FIG. 1 is a schematic representation of a gearing arrangement for an automatic transaxle capable of being controlled by the improved control valve circuit of our invention.

FIG. 2 is a chart showing the clutch and brake engagement and release pattern to effect ratio changes in the transmission structure of FIG. 1.

FIG. 3a and FIG. 3b together show a schematic control valve circuit embodying the features of our invention for controlling the transmission of FIG. 1.

FIGS. 4a through 4g show in schematic form a 2–1 scheduling valve in the various operating modes. This forms a part of the control system of FIGS. 3a and 3b.

FIGS. 5a through 5h show 2–3 shift valve in its various operating modes. It is part of the circuit of FIGS. 3a and 3b.

FIGS. 6a through 6e show a manual downshift modulating valve in its various operating modes. This is part of the control circuit of FIGS. 3a and 3b.

FIGS. 7a through 7g show a 2–3 throttle modulator valve in its various operating modes. It is part of the control system of FIGS. 3a and 3b.

FIG. 9 is a chart that shows the relationship between the road speed and the carburetor opening during a 2–1 downshift and a 1–2 upshift and during a 3–2 downshift and a 3–2 upshift.

PARTICULAR DESCRIPTION OF THE INVENTION

Figure 4A:
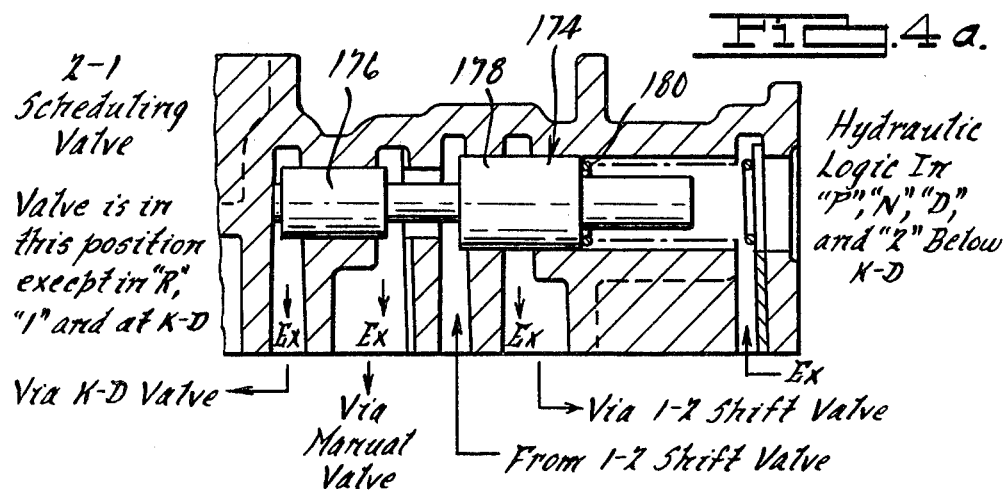
Figure 4B:
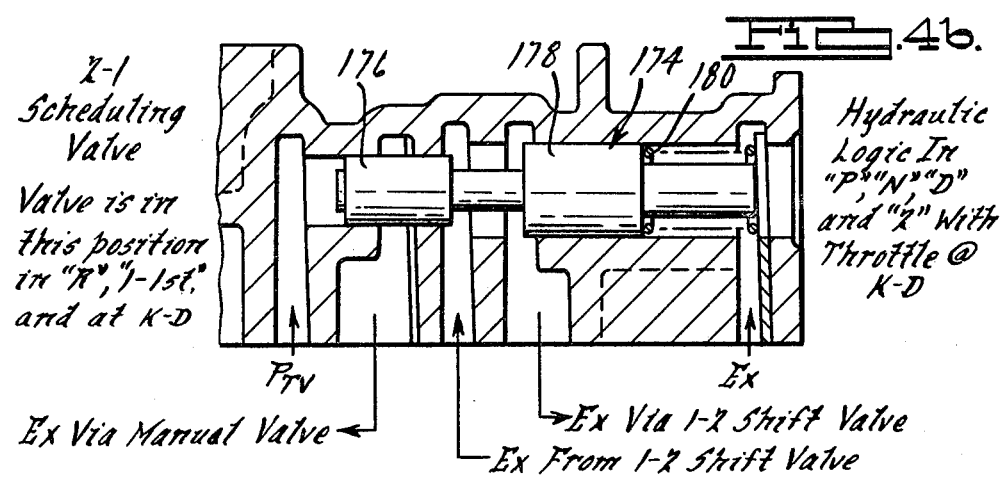
Figure 4C:
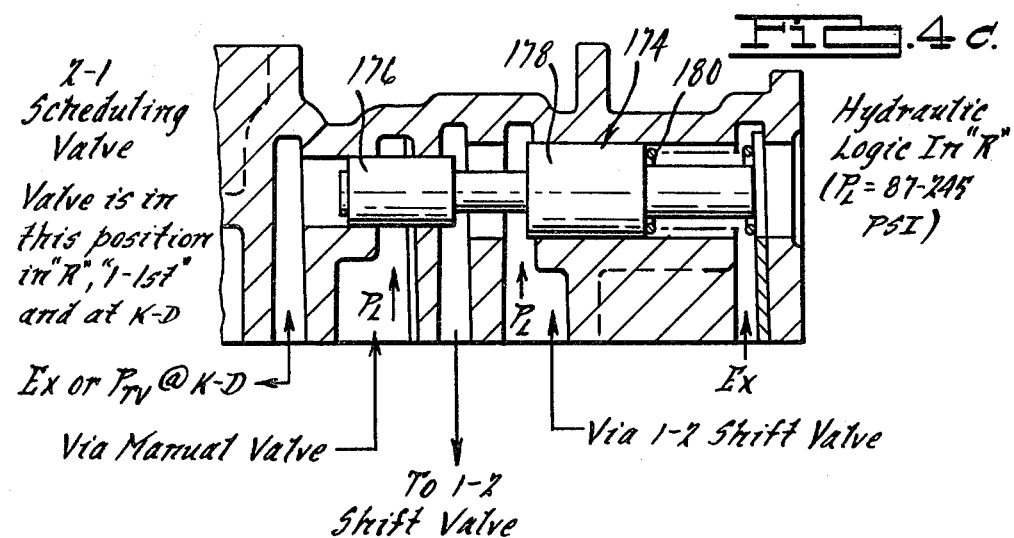

Shown in FIG. 1 is a schematic representation of the gearing assembly for a transaxle of the kind disclosed in the aforementioned United States application Ser. No. 134,240, filed by G. E. Lemieux, R. T. Lewicki and J. A. Clauss on Mar. 26, 1980. Reference may be had to that application to supplement the present description.

The gearing arrangement of FIG. 1 is adapted to transfer driving torque from the crankshaft of an internal combustion engine to traction wheels that are connected to the output shaft for the gearing arrangement through final drive gearing and a differential mechanism. It is adapted especially for use in a front wheel drive vehicle wherein the engine and the principal axis of the gearing arrangement are located transversely with respect to the center plane of the vehicle.

In FIG. 1 reference numeral 10 designates the engine crankshaft. It is connected drivably to a hydrokinetic torque converter 12 which comprises a bladed impeller 14 connected to the engine crankshaft, a bladed turbine 16 and a bladed stator 18. The impeller, the turbine and the stator are arranged in known fashion in a toroidal fluid flow circuit. The bladed stator 18 is mounted for rotation on a stationary stator shaft and is anchored by overrunning brake 20 against rotation in a direction opposite to the direction of rotation of the impeller during operation of the converter in the torque multiplication range although the brake 20 will permit free-wheeling motion of the stator during operation of the converter in the coupling range.

A simple planetary torque splitter gear unit is shown at 22. It includes a ring gear 24, sun gear 26, planet pinions 28 and a carrier 30, the latter journalling the pinions 28 so that they mesh with ring gear 24 and sun gear 26.

A compound planetary gearing unit is shown at 32. It includes a ring gear 34, a set of long planet pinions 36, a set of short planet pinions 38 and two sun gears of differential diameter, as shown at 40 and 42. Sun gear 42, which has the larger diameter, engages long planet pinions 36. Sun gear 40 engages short planet pinions 38. Long planet pinions 36 engage also pinions 38 and ring gear 34. Pinions 36 and 38 are journalled on a common carrier 44, which is connected by sleeve shaft 46 to input gear 48 of a final drive gearing assembly 50. The final drive gearing 50 includes a final drive output gear 52 which is connected to the output axle through a differential gear mechanism and an idler gear 54 which connects the gears 48 and 52.

Sun gear 42 is connected to brake drum 56 which is adapted to be braked by brake band 58.

Ring gear 34 is connected to clutch member 60, which carries brake discs 62. This is part of a friction brake that is applied to effect reverse drive operation as will be explained later.

The carrier 30 for the torque splitter gear unit 22 is connected to sleeve shaft 64 which extends through the gearing and which is connected to the clutch member 60 through a selectively engageable friction clutch 66. It is applied during operation in second speed ratio and direct drive ratio as will be explained later. A central pump drive shaft 68 extends through the transmission gearing and is connected operatively to fluid pump 70 which supplies fluid to the automatic control circuit. The carrier 30 delivers torque to the ring gear 34 when the clutch 66 is engaged. The turbine delivers torque hydrokinetically through the sleeve shaft 72 to the sun gear 40 when the friction clutch 74 is engaged. Turbine 16 is connected also to the sun gear 26 of the torque splitter gear unit 22. Sleeve shaft 72 also is adapted to transfer torque to the sun gear 40 through overrunning coupling 76.

In FIG. 2 the clutch and brake engagement-and-release pattern is shown for each of the driving conditions. The left hand column of FIG. 2 indicates the position of the manual valve. The designated positions are shown as D, "2" and "1". When the manual valve is positioned in the number 1 position, the transmission is conditioned for continuous operation in the lowest speed ratio. At that time brake 58 is applied, as is the clutch 74. For purposes of correlating the chart of FIG. 2 with the diagram of FIG. 1, the symbols $B_1$, $CL_1$, $CL_2$, $CL_3$ and OWC have been used, respectively, to identify the brake shown in part at 58, the clutch shown in part at 74, the clutch shown in part at 66, and the brake shown in part at 62. The symbol OWC designates the overrunning coupling 76. These auxiliary symbols have been applied also to the schematic diagram of FIG. 1.

During operation in the first speed ratio, brake $B_1$, and clutch $CL_1$ are applied. The sun gear 42 thus acts as a reaction member and torque is delivered to the sun gear 40. Since clutch $CL_2$ is disengaged, all of the torque is delivered hydrokinetically to the input element 40. This effects a maximum speed reduction. If the manual valve is moved to the drive position "D", first speed ratio is achieved without application of the clutch $CL_1$. Torque is transmitted from the sleeve shaft 72 to the sun gear 40 through the overrunning coupling 76 under these conditions. The low speed ratio then is the same as in the case when the manual valve is in the number 1 position, but the mechanism is conditioned for a subsequent upshift to the intermediate ratio. To achieve that intermediate ratio it is merely is necessary to apply a single clutch, namely clutch $CL_2$. This effects a dual delivery path for the torque from the torque splitter unit to the main gearing 32. The torque of the carrier 30 for the splitter unit is delivered through the engaged clutch $CL_2$ to the ring gear 34. The torque of the carrier contributes to the carrier torque that is developed mechanically. With the ring gear 34 now acting as an input element and the sun gear still acting as a reaction element, the gearing mechanism is conditioned for intermediate ratio operation and about 33 percent of the engine torque is delivered hydrokinetically while the balance is delivered mechanically.

Third speed ratio operation is achieved by engaging simultaneously clutches $CL_1$ and $CL_2$. Under these conditions the carrier torque for the torque splitter gear unit 32 is transferred through the engaged clutch $CL_2$ to the ring gear 34 and the sun gear torque for the torque splitter unit 22 is transferred through the engaged clutch $CL_1$ to the sun gear 40. This produces a 1:1 driving condition with approximately 16 percent of the torque being delivered hydrokinetically and 84 percent being delivered mechanically. The turbine 16 contributes to the carrier torque and to the sun gear torque for the torque splitter unit 22 during direct drive operation.

The valve system for controlling the application and release of the clutches and brakes for the transmission system described with reference to FIGS. 1 and 2 is illustrated in FIGS. 3A and 3B. The valve system includes a manual valve 80, which comprises a valve spool having four spaced valve lands 82, 84, 86 and 88. These register with internal valve lands formed in valve cavity 90. When the manual valve is positioned as shown, the transmission is conditioned for neutral. When it is shifted to the reverse position "R", passages 92 and 93 become pressurized since they are brought into communication with passage 94. Passage 94 in turn is connected as shown to the engine driven pump 70 and to the control passage 95.

When the manual valve is moved to the "D" position, pump pressure supply passage 94 is brought into communication with passage 96. Passages 92 and 93 are exhausted at that time as is passage 98, which also communicates with a manual valve. Passage 98 is pressurized when the manual valve assumes the reverse position "R" as are the passages 92 and 93.

Passages 96, 92 and 93 are pressurized also when the manual valve is moved to the number 1 position. Passages 96 and 92 are pressurized also when the manual valve is moved to the number 2 position. Passage 96 is exhausted when the manual valve assumes a reverse position, passage 92 is exhausted when the manual valve assumes the "D" position, passage 93 is exhausted when the manual valve assumes the 2 position or the "D" position and passage 98 is exhausted when the manual valve assumes any position except the "R" position.

A speed pressure signal is developed by fluid pressure governor 100. The governor is supplied with line pressure from passage 96 through passage 102 during operation in the forward drive ranges. Examples of fluid pressure governors of this kind are shown in U.S. Pat. Nos. 3,393,585 and 3,400,612.

The governor pressure signal is distributed to governor pressure passage 104 which supplies the various speed sensitive elements of the control system as will be explained later. A throttle valve assembly shown generally at 106 develops a pressure signal that is an indicator of the operator's demand for engine torque. It comprises a throttle valve spool having two spaced valve lands 108 and 110 slidably received in a ported valve sleeve 112. The position of the valve sleeve with respect to the valve spool is determined by an adjustable set screw 114 received in the valve body, the end of this groove engaging a tapered end 116 of the valve sleeve 112. The sleeve is adjusted in a left hand direction when the screw 114 is advanced toward the valve sleeve and it is adapted to be adjusted in a right hand direction as the screw 114 is retracted. This throttle valve adjustment feature is disclosed in pending patent application for Charles W. Lewis entitled "Transmission Throttle Valve Regulator Assembly", filed July 3, 1980, Ser. No. 165,883, which is assigned to the assignee of this invention.

A throttle valve plunger 118 is located at the left side of the valve assembly and compression spring 120 is disposed between the plunger 118 and the throttle valve spool.

Line pressure from the pump 70 is supplied to the throttle valve assembly through feed passage 122 which communicates with a port that registers with valve land 110. Exhaust port 124 registers with valve land 108. The output side of the throttle valve assembly is in communication with throttle pressure passage 126, which is in communication with the right hand side of the land 110 to provide a pressure feedback that opposes the force of the spring 120. Passage 126 communicates also with the left hand side of a pressure land 128 formed on the plunger 118 so that a pressure force is developed on the plunger 118. That tends to compress the spring 120, which assists the operator in moving the throttle plunger 118 in a right hand direction when the operator advances the engine carburetor throttle. Suitable mechanical linkage mechanisms are disposed between the operator controlled accelerator pedal and the engine carburetor throttle as well as between the accelerator pedal and the throttle valve plunger 118.

Throttle pressure passage 126 communicates also with the TV limit valve 130 which comprises a valve spool having valve lands of differential diameter, as shown at 132 and 134, the diameter of valve land 134 being the larger.

The TV limit valve spool is urged in a right hand direction by a valve spring 136 and it is slidably disposed in a ported valve chamber. When the throttle pressure in passage 126 is relatively low, the TV limit valve will be positioned in a right hand direction thereby establishing free communication between passage 126 and throttle pressure passage 138. When a limiting value for the throttle pressure in passage 126 is reached, the TV limit valve spool will be shifted in a left hand direction to restrict communication between passages 126 and 138 and to establish controlled communication between passage 138 and exhaust port 140. This establishes an upper limit on the value of the throttle pressure made available to the control circuit from passage 138.

The communication between passage 126 and the left hand side of the land 128 is shown in FIG. 3a by means of a dotted line. In the alternative the left hand side of the land 128 can communicate with passage 138 as shown by means of full lines in FIG. 3a so that the pressure assist that reduces the accelerator pedal effort will result from the pressure on the output side of the TV limit valve rather than from the pressure in passage 126 on the output side of the throttle valve assembly.

Passage 96 which extends from the output side of the manual valve, and which is pressurized during operation in the "D", 2 or 1 drive ranges, communicates with the 1-2 shift valve 142 and the 2-3 shift valve 144 as shown in FIG. 3b. These valves control, respectively, ratio changes between the low ratio and the intermediate ratio and between the intermediate ratio and the high ratio. Shift valve 142 comprises a valve spool 146 with spaced valve lands 148, 150 and 152 which are slidably received in a ported valve chamber formed in the control valve body. Pressure feed passage 154 extends to a pressure supply port in the valve body that registers with valve land 148. An exhaust port in the 1-2 shift valve chamber is shown at 156 at a location intermediate the lands 148 and 150. Passage 158, which communicates with the previously described passage 93 and which is pressurized when the manual valve is in either the "R" or 1 position, communicates with the 1-2 shift valve chamber adjacent land 152. Passage 160, which extends to the manual downshift modulating valve subsequently to be described, communicates with the 1-2 shift valve chamber adjacent land 150. Valve springs 162 and 163 normally urge the valve spool 146 in an upward direction. Throttle pressure modulator valve 164 is located in the lower end of the 1-2 shift valve chamber and it is engaged by the compression spring 162. It is provided with lands of differential diameter and an exhaust port 165 communicates with the valve chamber intermediate the differential diameter lands, the latter being shown at 166 and 168. Modulated throttle valve pressure from the TV limit valve passage 138 is distributed through crossover passage 170 to the spring chamber below the 1-2 shift valve land 148 to establish a force on the 1-2 shift valve that opposes the force developed by governor pressure on the land 152. Governor pressure is distributed to the upper end of the land 152 by governor pressure passage 172, which communicates with governor pressure passage 104.

A 2-1 scheduling valve, which is identified by reference character 174, is adapted to establish a proper 2-1 downshift point when the transmission is in a coasting condition with the manual valve in the number 1 position and when the speed is higher than a predetermined value such that the transmission continues to operate in an intermediate ratio condition following shifting movement of the manual valve to the number 1 position. The 2-1 scheduling valve includes two valve lands, the smaller land being shown at 176 and the larger land being shown at 178. The 2-1 scheduling valve is urged in a downward direction by valve spring 180.

The feed passage for the 2-1 scheduling valve is passage 93, which is pressurized as explained previously, when the manual valve is moved in the number 1 position. This establishes a force on the 2-1 scheduling valve because of the differential area of the lands 176 and 178. Passage 182, which communicates with the lower side of the land 176, is exhausted through the throttle valve assembly. This results in a 2-1 scheduling valve output pressure in passage 184 which is distributed to the lower end of the land 148 during coasting operation. This establishes the desired 2-1 downshift point.

Line pressure from the manual valve is distributed through passage 96 and through control orifice 186 and through the 2-3 backout valve 188 to the apply side of the servo for the brake $B_1$. The passage leading to the apply side of the brake servo from the 2-3 backout valve is shown at 190. It communicates with the apply side of fluid pressure operated piston 192 for the brake servo.

The 2-3 backout valve comprises spaced valve lands 194 and 196 on a valve spool that is urged in a downward direction by spring 198. The valve spool assumes a downward position during operation in third and reverse and an upward position in the other drive ranges. It assumes a downward position in third, however, only when the throttle pressure is at a minimum value. Throttle pressure acts on the upper end of valve land 194 and that throttle pressure is distributed to the 2-3 backout valve through passage 200 which communicates with passage 138. On a 2-3 upshift, line pressure from the 2-3 shift valve is distributed to the release side of the piston 192 through passage 202, and this same pressure is distributed to the lower end of the land 196 of the 2-3 backout valve. If the engine throttle is relaxed or if it is closed, the throttle pressure acting on the upper end of the land 194 is insufficient to hold the valve spool for the 2-3 backout valve in a downward direction so the release side of the servo piston 192 is brought into controlled communication with its apply side through the 2-3 backout valve, thus cushioning the shift by extending the time for release of the forward servo.

The 2-3 shift valve 144 comprises a valve spool 204 with spaced valve lands 206, 208, 210 and 212. Governor pressure from passage 104 and passage 172 acts on the upper end of the land 212. Modulated throttle pressure from the 2-3 modulator valve 214 is distributed through passage 216 to the lower end of the 2-3 shift valve land 206. The force produced by that modulated throttle pressure is assisted by spring 218. A 2-3 shift valve assumes the position shown in FIG. 3B when the transmission is operated in the first two underdrive ratios. At that time passage 220, which communicates with a port in the valve opening for the 2-3 shift valve, is exhausted through the 2-3 shift valve and through communicating passage 223 which extends through the exhausted passage 98. Control pressure from the control pressure line 96 is distributed to the 2-3 shift valve through passage 222.

When the 2-3 shift valve moves to the upshift position upon an increasing governor pressure for any given throttle pressure, passage 222 is brought into communication with passage 220 which sends a pressure release signal through passage 202 to the release side of the servo piston 192 for the brake $B_1$. At the same time control pressure is distributed from passage 220 and through passage 224, and through connecting passage 226, through the manual downshift valve 228 and hence to the direct clutch feed passage 230 which leads to the apply side of the piston 232 for the clutch $CL_1$. Orifice 234, orifice 236 and orifice 238, each orifice being shown in FIG. 36, control the rate of application of the direct clutch $CL_1$. Clutch $CL_1$ being applied and brake $B_1$ being released while clutch $CL_2$ remains applied, the transmission is conditioned for third speed ratio operation.

Clutch $CL_2$ also is applied during second speed ratio operation. This ratio is accomplished by the 1-2 shift valve on a 1-2 upshift. When the 1-2 shift valve is positioned as shown, passage 240 is connected to exhaust port 156. When the 1-2 shift valve moves to the upshift position upon an increase in governor pressure for a given throttle pressure, passage 240 is brought into communication with pressurized passage 154 and passage 240 distributes control pressure through the 1-2 capacity modulator valve 242 and to the feed passage 244 for the intermediate clutch $CL_2$.

The stroking of the intermediate clutch piston is controlled by a 1-2 accumulator 248, which comprises an accumulator piston 246, the left hand side of which communicates with the clutch feed passage 244 through accumulator orifice 250. The right hand side of the piston 246 communicates with pressurized passage 95 through control orifice 252. Alternatively the right hand side of the piston 246 may communicate with the throttle pressure passage 138 through control orifice 254 and throttle pressure passage 256. Piston 246 includes a smaller land 258 so that the pressure force resulting from the pressure on the right hand side of the piston 246 is the net pressure force. That net pressure force is assisted by accumulator spring 260.

As pressure is developed in clutch $CL_2$ upon a 1-2 upshift, the 1-2 accumulator piston 246 is stroked thereby controlling the rate of application of the clutch $CL_2$. When a shift is made in the high torque condition, the TV pressure force or the line pressure force, as appropriate, is higher and the accumulator piston stroking occurs at a higher pressure level for the clutch $CL_2$.

The intermediate clutch application is controlled also by the 1-2 capacity modulator valve which comprises a valve spool 262 with spaced lands 264 and 266. A feedback pressure passage 268 communicates through orifice 270 with the lower end of the land 266. The valve normally is urged in a downward direction by valve springs as shown. During initial application of the clutch $CL_2$, the modulator valve begins to modulate the pressure distributed to the clutch $CL_2$ through passage 244. After the clutch $CL_2$ is fully stroked, the pressure across the spool 262 becomes balanced and the spool 262 assumes a downward position under the influence of the spring. An exhaust port 272 registers with the land 266 facilitate the modulating action of the valve 242. For a better understanding of the operation of the 1-2 accumulator and the 1-2 capacity modulator valves, reference may be made to the previously mentioned disclosure of U.S. application Ser. No. 82,399, filed by Leonard et al.

The 2-3 modulator valve 214 comprises a valve spool with a small diameter land 274 and a larger diameter land 276. The area defined by the differential area lands 274 and 276 is exhausted through passage 278 which communicates through the 3-2 control valve 280 with the passage 224, which in turn is exhausted through passage 220, the 2-3 shift valve, reverse line pressure passage 223 and communicating passage 98 which is exhausted through the manual valve. Valve spring 282 urges the 2-3 modulator valve 214 in an upward direction. Throttle valve pressure is distributed to the upper end of land 274 through passage 284. The modulated throttle pressure in passage 216 is determined by the calibration of the spring 282, thereby establishing the 2-3 upshift point.

Figure 7A:
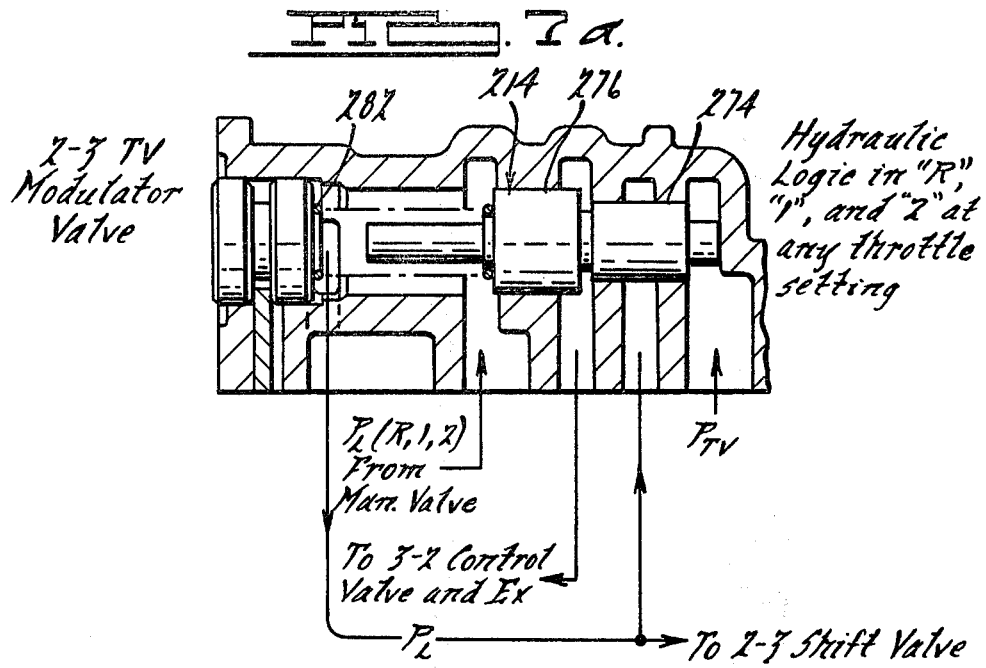
Figure 7B:
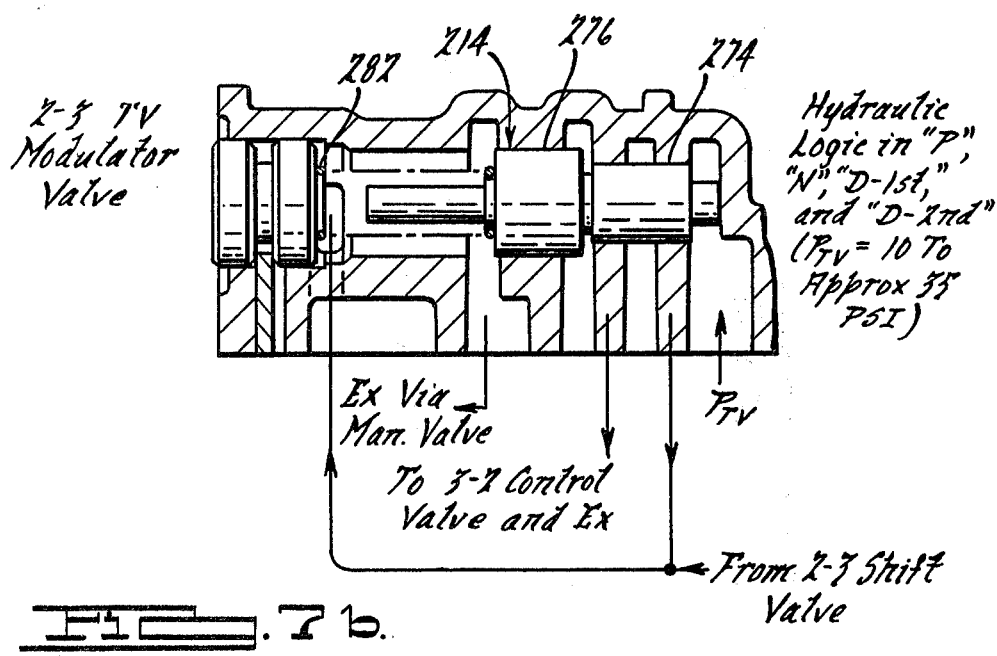

When the manual valve is in the "R" position, number 1 position or number 2 position, line pressure from the manual valve is distributed to the lower end of the land 276 through passage 286, thus moving the valve in an upward, nonmodulating position. This condition is shown in FIG. 7a. When the control circuit is in the $D_1$ or $D_2$ condition, the differential area of lands 274 and 276 is exhausted through the 3-2 control valve 280 and through the exhausted passage 220. This condition is seen in FIG. 7b which illustrates the position of the 2-3 modulator valve when throttle valve pressure is less than 35 psi. In the corresponding condition for the 2-3 modulator valve when the throttle pressure is in the higher range from 35 psi to the kick-down value, the valve is shifted to the left as shown in FIG. 7c.

FIG. 7d shows the condition of the 2-3 modulator valve when the manual valve is in the $D_1$ position or $D_2$ position and the throttle valve is in a kick-down mode.

FIG. 7e shows the position of the 2-3 modulator valve when the manual valve is in the D position and the throttle pressure is approximately 10 to 17 psi, which is an intermediate range of pressures. At that time modulated line pressure from the 3-2 control valve 280 is distributed through passage 278 to the differential area of lands 274 and 276 causing a modification of the calibration of the 2-3 modulator valve.

FIG. 7f shows the position of the 2-3 modulator valve when the manual valve is in the "D" position and the throttle pressure is 17 psi to the kick-down pressure value. The spring chamber for the spring 282 now is subjected to the output side of the 2-3 modulator valve. The resultant signal is distributed to the 2-3 shift valve to control the 2-3 upshift. At kick-down when throttle pressure is substantially equal to line pressure, the 2-3 modulator valve assumes a position shown at FIG. 7b at which time the modulator valve is no longer in a modulating mode.

FIGS. 5a through 5h show the various operating positions for the 2-3 shift valve throughout the various operating ranges. FIG. 5a shows the hydraulic logic that exists when the selector is in the "P" or "N" positions. The corresponding hydraulic diagram for the 2-3 shift valve when the selector is in the "R" position is shown in FIG. 5b. FIG. 5c shows the position on the shift valve and the direction of pressure distribution when the manual selector valve is in the "1" position and the transmission is operated in the first gear ratio. FIG. 5d shows the position of the 2-3 shift valve when the manual valve is in the number 1 position with the transmission in condition for second speed ratio and the position of the 2-3 shift valve when the manual valve is in the "2" position and the transmission is in the first or second speed ratio. Since the governor pressure cannot be greater than line pressure, the 2-3 shift valve spring will move the 2-3 shift valve to the position shown in FIG. 5e causing a 3-2 downshift. That is, the downshift will occur whenever the selector lever at the manual valve is moved to the "1" position or the "2" position from the D position. A 3-2 downshift then will occur. Conversely, a 2-3 upshift cannot occur if the selector is in the number 1 or number 2 positions.

FIG. 5f shows the 2-3 shift valve when the manual valve is in the "D" position and the transmission is in condition for first speed ratio or second speed ratio operation. FIG. 5g shows the 2-3 shift valve when the manual valve is in the "D" position and the transmission is at a transition point between a 2-3 upshift and a 3-2 downshift. In FIG. 5h the 2-3 shift valve is represented in the fully upshifted position when the selector lever and manual valve are in the "D" position and the transmission is in third speed ratio.

The chart of FIG. 9 shows the various shift patterns; that is, it shows a plot of the output speed of the transmission in relation to throttle pressure or a carburetor throttle opening. The final drive speed at which a 1-2 upshift will occur for any given carburetor opening is shown by line "A". The corresponding 2-1 downshift is shown by line "B". The downshift occurs at lower speeds because of the differential areas of the lands on the 1-2 shift valve. Note, for example, that land 150 is of greater diameter than land 148. Because of the pressure forces imposed by these differential areas, the speeds at which the 2-1 downshift occurs for any given throttle setting will be lower than the corresponding speed at which an upshift occurs at that same carburetor throttle opening. The same is true with respect to a 2-3 upshift and a 3-2 downshift. Note that lands 208 and 210 have differential areas. The pressure forces imposed on the 2-3 shift valve by these differential areas effects a separation in the 2-3 upshift curve "C" and the 3-2 downshift curve "D". The pressure supplied to the 2-3 shift valve by the 3-2 control valve also effect a separation of curve "C" and "D" in FIG. 9.

The TV limit valve prevents an increase in throttle pressure when the carburetor throttle is advanced beyond a 57° setting to the wide open throttle position. That is the reason that a sharp break occurs at the upper end of each of the curves "A" through "D" where the curves become vertical.

The corresponding 1-2 kick-down and 2-1 kick-down shift points as well as the 2-3 kick-down shift points have been illustrated also in FIG. 9 and are represented in each case by vertical lines.

The 3-2 control valve comprises a valve spool 290 with differential diameter lands 292 and 294. A valve spring 296 urges it in an upward direction. The upper end of land 292 is subjected to line pressure from passage 298, which is pressurized when the manual valve is in the "R", number 1 or number 2 positions. It is exhausted at other times. It is exhausted when the manual valve is in the "D" position. When the manual valve is in the number 1 or number 2 positions, passage 278 is exhausted through exhaust port 300. Thus the 3-2 control valve does not influence the calibration of the 2-3 modulator valve except when the manual valve is in the "D" position.

The 3-2 kick-down timing valve 302 comprises a valve spool having a first land 304 that is subjected to governor pressure distributed to it from passage 306 and a second land 308 which is engaged at its lower end by valve spring 310. When governor pressure is above approximately 35 psi a downshift is effected by exhausting both the direct clutch and the servo release side for the brake $B_1$ thereby causing the brake $B_1$ to be applied. The direct clutch $CL_1$ is exhausted through the orifice 234, through the manual downshift modulating valve 228, through orifice 312 in the line 226, through orifices 314 and 316 in the line 226, through orifice 236 in the line 220, through the 2-3 shift valve and then through orifice 318 in the line 223 to the exhausted passage 98. At the same time servo release oil is exhausted through orifice 320, through the 3-2 kick-down timing valve 302, and through the 3-2 torque demand timing valve 322 and orifice 324 to the upstream side of the orifice 236. Thereafter the exhaust path is common with the exhaust path for the direct clutch exhaust.

The torque demand timing valve comprises lands 326, 328, and 330. Valve 322 is moved in an upward direction normally by spring 332. During a 3-2 downshift with the governor pressure between approximately 29 psi and 44 psi, the direct clutch exhaust path follows the route previously described, but the servo release exhaust now follows the path defined by orifice 320 the 3-2 kick-down timing valve and then through the orifice 334 to the upstream side of the orifice 236. Fluid also passes from the 3-2 timing valve to the 3-2 torque demand timing valve, through passage 336 and through the torque demand timing valve and the orifice 324 to the upstream side of the orifice 236. The flow path then follows the same exhaust path previously described.

Figure 8D:
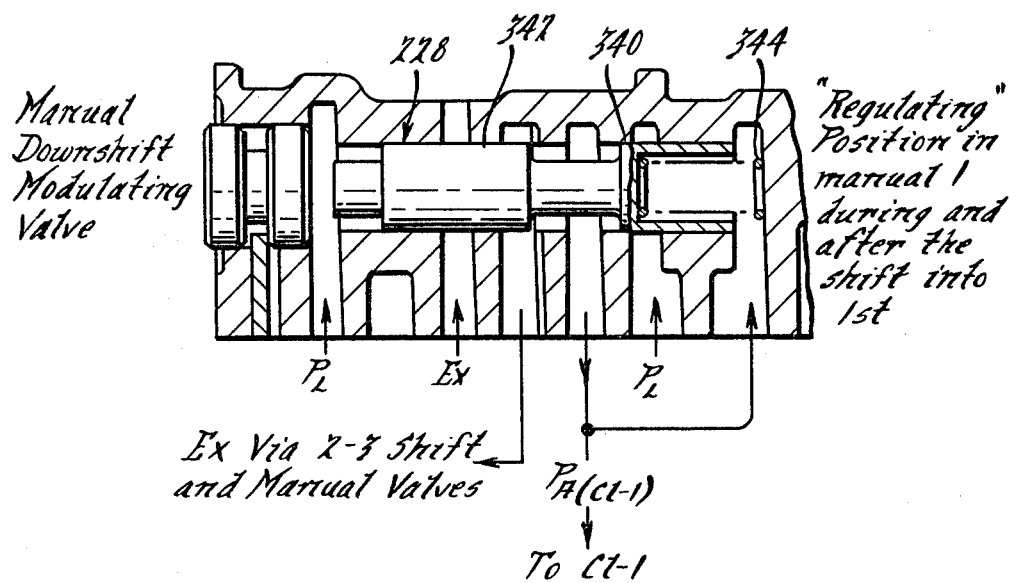
FIGS. 8a, 8b and 8c show a 3–2 downshift timing logic diagram which show the directional flow during a 3–2 downshift under various operating conditions and various vehicle speeds.
Figure 8E:
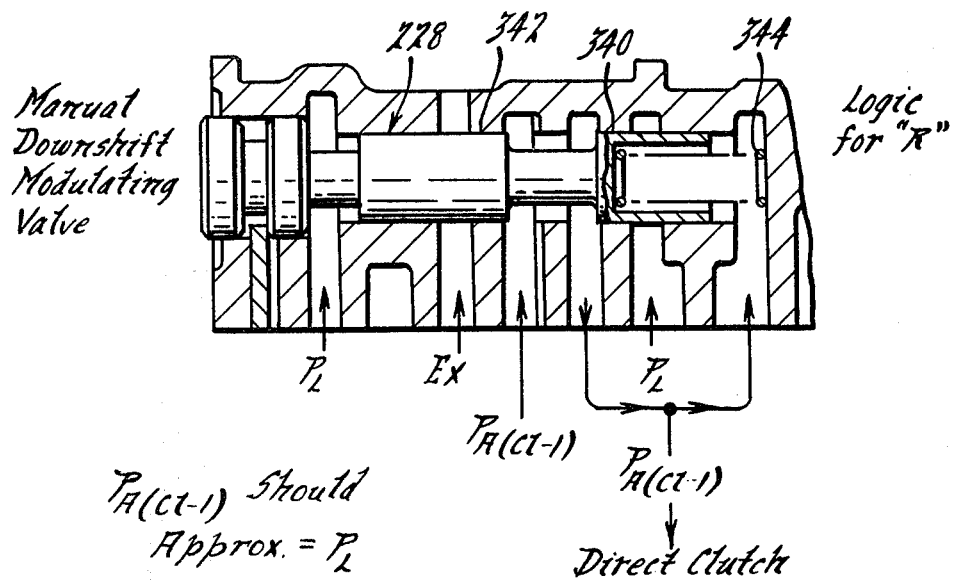

A 3-2 downshift at governor pressures less than approximately 29 psi occurs by exhausting the direct clutch through the same path previously described, but the servo release exhaust path is defined by orifice 320, 3-2 kick-down timing valve 302, the torque demand timing valve 322 and then to the upstream side of the orifice 324. Again the orifices 334 and 324 are brought into parallel operation. Part of the exhaust flow path is defined by passage 336 and by the passage 338 which extends to the passage 226, the latter containing orifices 312, 314 and 316 as mentioned previously. Thus the shift timing is calibrated depending upon the speed at which a 3-2 downshift takes place. The orifice can be calibrated to effect an optimum shift timing condition for each of the three separate driving conditions described with reference to FIGS. 3a and 3b. The logic diagrams that illustrate these three driving conditions are shown in FIGS. 8a, 8b and 8c. The fluid flow path for each of these driving conditions is illustrated by arrows, and the orifices through which the exhaust path for the direct clutch and the servo release extends have been illustrated in these logic diagrams by the same reference characters used in FIGS. 3a, 3b to facilitate a ready understanding of the various 3-2 downshift modes.

The manual downshift valve 228 comprises spaced valve lands 340 and 342. It is spring biased in a downward direction as seen in FIG. 3b by valve spring 344. The manual downshift modulating valve assumes an upward position when the manual valve is moved to the number 1 position. That is due to the fact that passage 160 extending to the lower side of the land 342 communicates through the 1-2 shift valve with passage 93, which is pressurized, as explained previously, when the manual valve is in the "R" or number 1 position. Communication is established between control pressure passage 96 and passage 230 across orifice 346. As the clutch strokes, the pressure made available to the clutch acts on the spring side of the manual downshift modulating valve, thereby causing the valve to modulate during the period in which the clutch is being applied. This cushions the application of the clutch.

The function of the manual downshift modulating valve can best be understood by referring to FIGS. 6a through 6e. FIG. 6a shows the position of the valve and the pressures that are applied to it when the manual valve is moved to the $D_1$ position, the $D_2$ position, and the "2" position with the transmission in the first ratio and the "2" position with the transmission in the second ratio. FIG. 6b shows the manual downshift modulating valve where the pressure shown as $P_a$ (CL$_1$) is equal to the servo release pressure during the 2-3 upshift. That pressure rises to the value $P_L$ after the shift is completed. FIG. 6b shows the position that the valve assumes when the manual valve is in the "D" position and the transmission is in the third ratio. FIG. 6c shows the position of the valve when the direct clutch is filling at the beginning of the direct clutch application stroke. The valve is shown in the initial position when the manual valve is in the number 1 position of the "R" position while the clutch is filling. FIG. 6d shows the manual downshift modulating valve in the regulating position when the manual valve is in the number 1 position during and after the shift into the first ratio. FIG. 6e shows the position of the manual downshift modulating valve when the manual valve is in the "R" position. In this case the pressure $P_a$ (CL$_1$) should be approximately equal to line pressure $P_L$.

Figure 10:
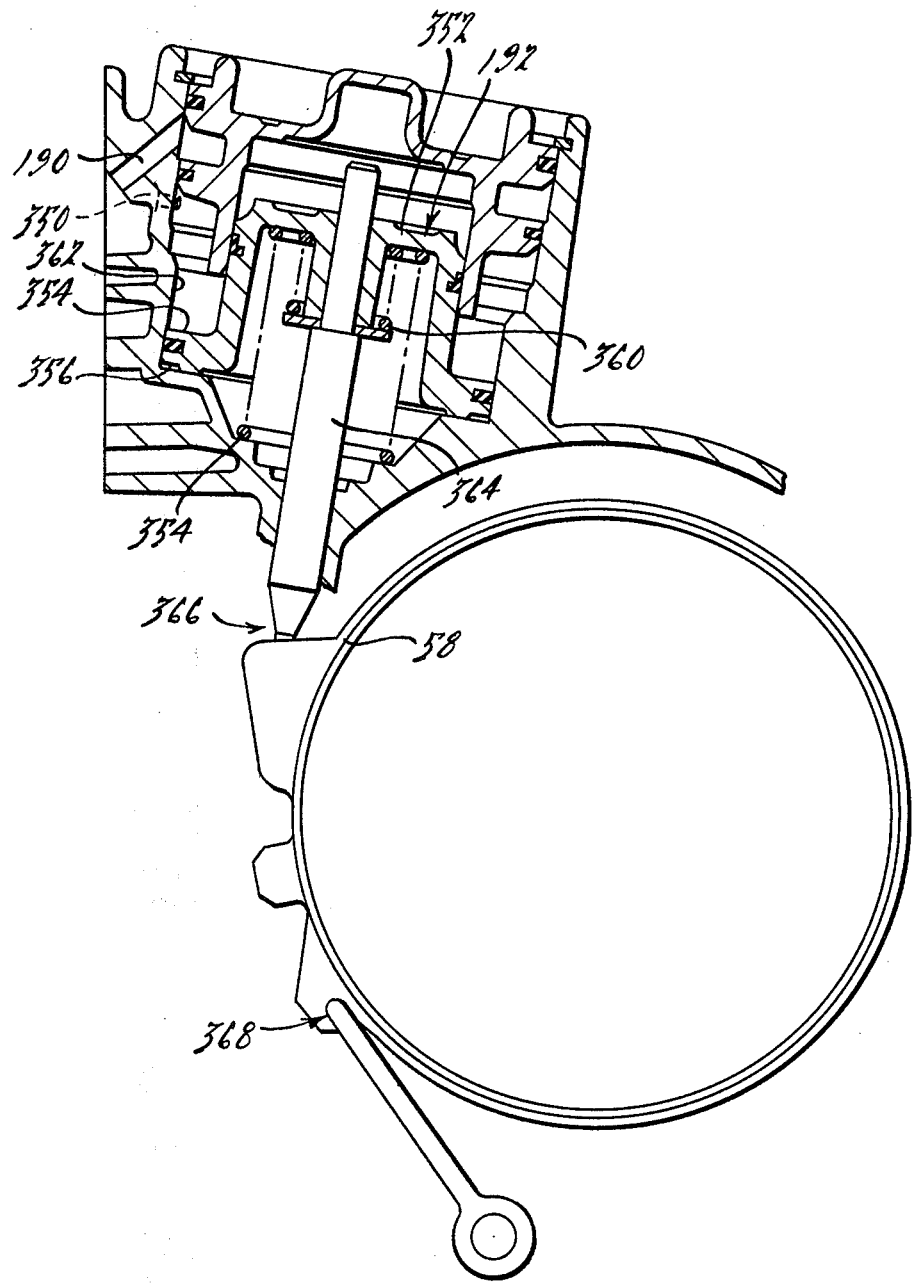
FIG. 10 is an enlarged cross sectional view of the low and intermediate brake servo of FIG. 3b.

When the manual valve is moved to either the "R" or 1 position, passage 160 is pressurized as mentioned earlier. This pressure is distributed to an apply boost area on the piston 192 for the forward brake $B_1$. Communication is established between the brake $B_1$ and passage 160 by passage 350. The construction of the servo for brake $B_1$ can best be seen by referring to FIG. 10. The piston 192 as seen in FIG. 10 comprises an apply pressure area 352 and a boost pressure area, which is an annular area as seen at 354. A pressure release area 356 is on the opposite side of the piston 192. The piston 192 is urged in a right hand direction by valve springs 354 and 360. As seen from FIG. 10, the effective pressure area 356 on the release side of the piston is approximately equal to the sum of the effective pressure areas 352 and 354 on the apply side of the piston. Area 354 is pressurized during reverse and low speed operation when the manual valve is in the number 1 position, as explained previously, thereby providing additional torque capacity for the brake $B_1$. The piston is slidably received in servo cylinder 362 and it is operatively connected to piston rod 364, which is connected to the operating end of brake band 58 by a mechanical connection 366. The other end of the brake band 58 is anchored by an anchor strut as illustrated schematically at 368.

The main oil pressure regulator valve 370 provides a regulated circuit pressure level for the valve system. It communicates with the control pressure passage 96 and comprises a regulating valve spool 372 with three operating lands 374, 376 and 378. Valve spool 372 is located in a ported valve chamber and it is urged in an upward direction by valve spring 380. An exhaust port 382 is located on one side of land 376 and the pressure feed port 384 is located between the lands 376 and 378. The output port 386, which is the low pressure side of the valve, communicates in the conventional fashion with the torque converter and the cooling circuit as well as the lubrication circuit as illustrated schematically in FIG. 3d. The upper side of the land 374 serves as a feedback pressure area. Thus the valve is capable of maintaining a regulated pressure level in the circuit depending upon the calibration of the spring 380.

A pressure booster valve member is located at the base of the main oil pressure regulator and comprises three spaced valve lands 388, 390 and 392. Throttle pressure acts on the lower side of the land 392 so that the pressure developed by the throttle pressure assists the valve spring 380 to cause an increase in the regulated circuit pressure level in accordance with increases in torque demand by the vehicle operator. A pressure boost is obtained also during reverse drive by directing throttle pressure to the differential area of lands 390 and 392 through passage 394 which communicates with reverse boost valve 396. This valve has valve lands 398 and 400 which establish communication between passage 394 and throttle pressure passage 402 when the valve 396 moves upwardly. It moves upwardly whenever the manual valve is moved to the "R" position since it communicates at its lower end with reverse line pressure passage 98 through passage 404. Valve 396 normally is urged in a downward direction by valve spring 406. An additional line pressure boost is obtained by connecting the passage 98 with the differential area of lands 388 and 390 through passage 408.

Having described a preferred form of our invention, what we claim and desire to secure by U.S. Letters Patent is:

1. A control system for an automatic transmission for delivering torque from a driving member to a driven member comprising:
   planetary gear elements connecting said driving and driven members;

fluid pressure operated clutch means for connecting two gear elements together to establish a high speed ratio;

fluid pressure operated brake means for anchoring one of said gear elements to establish an underdrive speed ratio, said brake means comprising a fluid pressure piston in a cylinder with a brake apply pressure chamber on one side of said piston and a brake release pressure chamber on the other side of said piston;

a pressure source;

conduit structure connecting said pressure source and said clutch means and connecting said pressure source and said pressure chambers;

shift valve means in said conduit structure for controlling pressure distribution to said clutch and brake means whereby ratio changes may be accomplished between said high speed ratio and said underdrive ratio;

governor valve means for developing a pressure signal proportional to driven speed of said driven member, throttle valve means for developing a pressure signal proportional to the torque on said driving member;

said governor valve means and said throttle valve means being connected to said shift valve means for imposing thereon opposed activating forces;

said transmission assuming a high speed ratio condition when said clutch means and said release pressure chamber are pressurized simultaneously and assuming an underdrive condition when said clutch means and said pressure release chamber are exhausted;

separate exhaust pressure flow paths for said clutch means and said release pressure chamber including a common flow path portion, said shift valve means being disposed in and forming a part of said common flow path portion;

a downshift kick-down timing valve means and a downshift torque demand timing valve means in the exhaust flow path for said pressure release chamber, each timing valve means being responsive to said speed pressure signal;

the exhaust flow path extending from said release pressure chamber having parallel branches, said downshift kick-down timing valve means being on the exhaust flow upstream side of said downshift torque demand timing valve means;

a plurality of orifices in said exhaust flow paths, a first of said orifices being in the exhaust flow path for both the said clutch means and said release pressure chamber and a second of said orifices being in the flow path for said pressure release chamber only;

said timing valve means each responding to said speed pressure signal to provide a flow path through a first set of said orifices at speeds of said driven member less than a predetermined valve and through a second set of said orifices at speeds of said driven member greater than said predetermined value.

2. The combination as set forth in claim 1 wherein said timing valve means each responds to said speed pressure signal to provide a flow path through first ones of said orifices at speeds of said driven member less than a first predetermined value and through second ones of said orifices at speeds of said driven member between said first predetermined value and a second predetermined value and through third ones of said orifices at speeds of said driven member greater than said second predetermined value.

3. The combination as set forth in claim 1 wherein said first orifice is located in one of said parallel branches and in the exhaust flow path for said clutch means and the second orifice is located in the other of said parallel branches, said timing valve means responding to changes in said speed signal to distribute selectively fluid from said pressure release chamber to each of said parallel branches.

4. The combination as set forth in claim 1 wherein said common flow path portion includes additional calibrated flow control orifices.

5. The combination as set forth in claim 2 wherein said common flow path portion includes additional calibrated flow control orifices.

6. The combination as set forth in claim 3 wherein said common flow path portion includes additional calibrated flow control orifices.

7. The combination as set forth in claim 3 wherein said first orifice is located in said one of said parallel branches in series relationship with said downshift kick-down timing valve means and said downshift torque demand timing valve means.

* * * * *

UNITED STATES PATENT AND TRADEMARK OFFICE
CERTIFICATE OF CORRECTION

PATENT NO. : 4,413,536
DATED : November 8, 1983
INVENTOR(S) : Douglas A. Whitney et al It is certified that error appears in the above-identified patent and that said Letters Patent are hereby corrected as shown below:

In the Abstract, line 3, "ration" should read -- ratio --.

Column 1, line 36, after "during" insert -- reverse drive and low speed ratio continuous operation. A --.

Signed and Sealed this

Seventeenth Day of July 1984

[SEAL]

Attest:

GERALD J. MOSSINGHOFF

Attesting Officer    Commissioner of Patents and Trademarks